United States Patent
Ohsato et al.

(10) Patent No.: US 8,113,065 B2
(45) Date of Patent: Feb. 14, 2012

(54) FORCE SENSOR

(75) Inventors: Takeshi Ohsato, Wako (JP); Shigenori Yasuie, Wako (JP); Yusuke Hirabayashi, Wako (JP); Hiroshi Yokobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 12/310,197

(22) PCT Filed: Aug. 24, 2007

(86) PCT No.: PCT/JP2007/066952
§ 371 (c)(1),
(2), (4) Date: Feb. 17, 2009

(87) PCT Pub. No.: WO2008/023846
PCT Pub. Date: Feb. 28, 2008

(65) Prior Publication Data
US 2009/0320610 A1    Dec. 31, 2009

(30) Foreign Application Priority Data
Aug. 24, 2006  (JP) .................... 2006-227467

(51) Int. Cl.
G01L 1/22 (2006.01)
G01D 7/00 (2006.01)
H01C 17/28 (2006.01)
H01C 17/00 (2006.01)

(52) U.S. Cl. ......... 73/862.044; 73/862.041; 73/862.043; 73/862.042; 29/621.1; 29/610.1; 29/592.1

(58) Field of Classification Search .......... 73/862.041–862.045, 764; 29/621.1, 29/610.1, 592.1
See application file for complete search history.

(56) References Cited

U.S. PATENT DOCUMENTS

| | | | | |
|---|---|---|---|---|
| 3,985,025 A | * | 10/1976 | Ormond | 177/255 |
| 4,454,771 A | * | 6/1984 | Shimazoe et al. | 73/862.68 |
| 4,905,523 A | * | 3/1990 | Okada | 73/862.044 |
| 5,095,762 A | * | 3/1992 | Holm-Kennedy et al. | 73/862.041 |
| 5,437,196 A | * | 8/1995 | Okada | 73/862.043 |
| 5,526,700 A | | 6/1996 | Akeel | |
| 6,742,390 B2 | * | 6/2004 | Mochida et al. | 73/504.14 |
| 6,823,744 B2 | * | 11/2004 | Ohsato et al. | 73/862.041 |

(Continued)

FOREIGN PATENT DOCUMENTS
EP   1 653 208 A2   5/2006
(Continued)

*Primary Examiner* — Lisa Caputo
*Assistant Examiner* — Jonathan Dunlap
(74) *Attorney, Agent, or Firm* — Squire Sanders (US) LLP

(57) ABSTRACT

A force sensor 1 includes: a force sensor chip 2 including an action portion 21, a connecting portion 23 on which strain resistive elements are disposed, and a support portion 22 for supporting the action portion 21 and the connecting portion 23; an attenuator 3 including an input portion 30 to which an external force is input, a fixing portion 32 for fixing the force sensor chip 2, and a transmission portion 31 for attenuating the external force and transmitting the attenuated external force to the action portion 21; a first glass member 11 disposed between the action portion 21 and the transmission portion 31 and a second glass member 12 disposed between the support portion 22 and the fixing portion 32, through which glass members 11, 12 the force sensor chip 2 and the attenuator 3 are joined. A single or more glass beams 13 joins the first glass member 11 and the second glass member 12 together as a single member.

22 Claims, 20 Drawing Sheets

U.S. PATENT DOCUMENTS

| | | | |
|---|---|---|---|
| 6,951,142 B2 * | 10/2005 | Ohsato et al. | 73/862.041 |
| 7,360,456 B2 * | 4/2008 | Morimoto | 73/862.044 |
| 7,458,281 B2 * | 12/2008 | Ohsato et al. | 73/862.044 |
| 7,490,524 B2 * | 2/2009 | Ohsato et al. | 73/862.629 |
| 7,536,922 B2 * | 5/2009 | Sakurai et al. | 73/862.041 |
| 7,536,923 B2 * | 5/2009 | Hirabayashi et al. | 73/862.044 |
| 7,594,445 B2 * | 9/2009 | Hirabayashi et al. | 73/862.044 |
| 7,637,174 B2 * | 12/2009 | Hirabayashi | 73/862.041 |
| 7,703,340 B2 * | 4/2010 | Sakurai et al. | 73/862.044 |
| 7,707,899 B2 * | 5/2010 | Sakurai et al. | 73/862.044 |
| 7,757,571 B2 * | 7/2010 | Hirabayashi et al. | 73/862.626 |
| 2003/0140713 A1 * | 7/2003 | Ohsato et al. | 73/862.041 |
| 2003/0177839 A1 | 9/2003 | Tsukada et al. | |
| 2004/0164753 A1 * | 8/2004 | Hettori et al. | 324/725 |
| 2004/0255697 A1 * | 12/2004 | Okada | 73/862.043 |
| 2005/0081645 A1 * | 4/2005 | Ohsato et al. | 73/862.041 |
| 2006/0086190 A1 * | 4/2006 | Ohsato et al. | 73/764 |
| 2006/0174718 A1 * | 8/2006 | Morimoto | 73/862.044 |
| 2007/0000335 A1 * | 1/2007 | Morimoto | 73/862.045 |
| 2007/0006668 A1 * | 1/2007 | Hirabayashi et al. | 73/862.541 |
| 2007/0266797 A1 * | 11/2007 | Hirabayashi et al. | 73/862.044 |
| 2008/0034897 A1 * | 2/2008 | Ohsato et al. | 73/862.629 |
| 2008/0047366 A1 * | 2/2008 | Kuriyama et al. | 73/862.627 |
| 2008/0053247 A1 * | 3/2008 | Sakurai et al. | 73/862.041 |
| 2008/0066562 A1 * | 3/2008 | Sakurai et al. | 73/862.044 |
| 2008/0156112 A1 * | 7/2008 | Sakurai et al. | 73/862.474 |
| 2008/0178688 A1 * | 7/2008 | Hirabayashi | 73/862.041 |
| 2008/0282813 A1 * | 11/2008 | Hirabayashi et al. | 73/862.626 |
| 2009/0301226 A1 * | 12/2009 | Hirabayashi et al. | 73/862.626 |
| 2009/0320610 A1 * | 12/2009 | Ohsato et al. | 73/862.043 |
| 2010/0011885 A1 * | 1/2010 | Ohsato et al. | 73/862.627 |

FOREIGN PATENT DOCUMENTS

| | | |
|---|---|---|
| JP | 64-075930 | 3/1989 |
| JP | 03-020635 | 1/1991 |
| JP | 07-176766 | 7/1995 |
| JP | 2003-207405 | 7/2003 |
| JP | 2003-254843 | 9/2003 |
| JP | 2004-3926 A | 8/2004 |

* cited by examiner

Fx application

Fz application

My application

Mz application

FORCE SENSOR

BACKGROUND OF THE INVENTION

1. Field of the Invention

The present invention relates to a force sensor and a method for producing the force sensor, and particularly to a force sensor in which a positioning of a glass member is facilitated upon joining a force sensor chip and an attenuator through the glass member, and joint strength is prevented from being reduced when the force sensor chip and the attenuator are joined by anodic bonding, and a method for producing the force sensor.

2. Description of the Related Art

Conventionally, in an industrial robot and the like, there has been adopted a multi-axis force sensor for accurately measuring a size and direction of an external force applied to the robot during an action of the robot, in order to implement a control under which the robot appropriately and flexibly responds to the external force.

As the multi-axis force sensor, for example, there has been known a force sensor utilizing a property of a strain resistive element (piezo resistive element), in which a resistance value changes in accordance with minute strain (compression, tension) caused by an applied external force (See, for example, Japanese unexamined patent publication Nos. 2003-207405 and 2003-254843, the disclosures of which are herein incorporated by reference in their entireties).

The multi-axis force sensor has a force sensor chip formed on a semiconductor substrate by a semiconductor production process, and an attenuator made of a metal member for accommodating and securing the force sensor chip.

Specifically, in the force sensor chip, the strain resistive elements are appropriately arranged around an action portion to which an applied external force is transmitted, and a change in a resistance value of the strain resistive element due to the external force is detected as an electrical signal, which presents a size and direction of the external force. If the applied external force is directly transmitted to the strain resistive element, and the external force is excessively large, the force sensor chip may be damaged. In order to receive the external force of various magnitudes without causing damage, the attenuator is introduced for attenuating the applied external force to an appropriate magnitude to transmit to the force sensor chip.

Though various types of attenuators are present, in a typical attenuator, the force sensor chip is held from below by a fixing portion, and is joined to a lower fixing portion and an upper transmission portion in such a manner that an external force is transmittable from the upper transmission portion to the force sensor chip.

In this case, if the force sensor chip formed on the semiconductor substrate is directly joined with the attenuator made of a metal member, there arise problems, such as electric hazard including leakage from an electric source, detachment of two members at the joint portion due to a difference in coefficient of thermal expansion between two members, and thermal strain, all of which may deteriorate the detection accuracy.

In order to overcome the problems, some conventional techniques introduce a bulky (massive) glass plate, which has approximately the same thickness as that of the semiconductor substrate, as an interface between the force sensor chip and the attenuator, from a viewpoint of insulation property and coefficient of thermal expansion. For joining the glass plate to the force sensor chip and to the attenuator, an epoxy resin adhesive is applied to the joint faces thereof, or the joint faces are chemically bonded by anodic bonding. In anodic bonding, while the subject is heated, a voltage is applied to the subject with a negative voltage on a glass plate side and a positive voltage on an object to be joined, in order to transfer alkali ion, such as $Na^+$, from the glass to the object. Typical thickness of the glass plate to be joined to the object is approximately 0.1 to several mm.

The conventional anodic bonding method will be specifically described with reference to FIGS. 19A-D. FIGS. 19A-D illustrates steps of anodic bonding at joint portions of a force sensor chip and an attenuator with the presence of a glass plate therebetween, in which FIG. 19A shows joining of the glass plate and the attenuator, FIG. 19B shows joining of the attenuator with the glass plate joined thereto and the force sensor chip, FIGS. 19C and 19D are cross sectional views showing a case where anodic bonding is applied to a specific attenuator, in which FIG. 19C shows joining of the glass plate and the attenuator, and FIG. 19D shows joining of the attenuator with the glass plate joined thereto and the force sensor chip.

In the anodic bonding, as described above, a voltage is applied to the subject with a negative voltage on the glass plate, and a positive voltage on an object to be joined. Accordingly, when the attenuator and the glass plate are joined at first, as shown in FIG. 19A, a voltage is applied to the subject with a negative voltage on the glass plate 100 and a positive voltage on the attenuator 300. Then, when a complex of the attenuator 300 with the glass plate 100 joined thereto and the force sensor chip 200 are joined by anodic bonding, as shown in FIG. 19B, a voltage is applied with a negative voltage on an attenuator 300 side and thus on a glass plate 100 side of the joint portion 600, and a positive voltage on the force sensor chip 200.

A specific example for the anodic bonding will be described with reference to a force sensor 1000. As shown in FIGS. 19C and 19D, for example, when the attenuator 300 is joined with a first glass member 110 and a second glass member 120 through a joint portion 510 and a joint portion 520, respectively, by anodic bonding (see FIG. 19C), and the force sensor chip 200 is joined with the first glass member 110 and the second glass member 120 through a joint portion 610 and a joint portion 620, respectively, by anodic bonding, anodic bonding is performed by applying a voltage with a negative voltage on a second glass member 120 side and a positive voltage on a force sensor chip 200 side (see FIG. 19D).

It should be noted that, in this explanation of the conventional anodic bonding, the attenuator 300 and the glass plate 100 are joined first, and then the glass plate 100 and the force sensor chip 200 are joined; however, there may be a case in which the force sensor chip 200 and the glass plate 100 are joined first and then the glass plate 100 and the attenuator 300 are joined.

However, when an epoxy resin adhesive is used at a joint portion of the attenuator and the force sensor chip, adhesion may become poor due to aged deterioration of the adhesive. In addition, a joint surface may be deformed or adhesive strength may become smaller, due to repeated compression and tension caused by external force on the attenuator. As a result, there arises a problem that minute change in external force cannot be accurately transmitted.

When the attenuator and the force sensor chip are joined by anodic bonding, and two portions including a fixing portion and a transmission portion are separately joined to the attenuator, a positioning step and joining step of the glass member should be performed for each of the fixing portion and the transmission portion, leading to a redundant number of steps.

Especially, an action portion facing a center portion of the force sensor chip should be accurately positioned, though the subject to be positioned (the joint portion and the glass plate) are very small and thus the positioning frequently becomes difficult.

Further in anodic bonding, directions of voltage applied to the joint portion 500 are opposite between a case of joining of the attenuator 300 with the glass plate 100 (FIG. 19A), and a case of joining of the glass plate 100 with the force sensor chip 200 (FIG. 19B). As a result, fracture in the joint interface may occur from alkali ion (e.g., $Na^+$) in the glass plate 100, leading to problems, such as reduced joint strength and detachment of the joint face.

These problems also occur in a case where first the force sensor chip 200 is joined with the glass plate 100 and then the glass plate 100 is joined with the attenuator 300.

The above-mentioned problems of the anodic bonding will be described with reference to a specific example of the force sensor 1000 as shown in FIGS. 19C and 19D.

In the force sensor 1000, as shown in FIG. 19C, first a voltage is applied with a positive voltage on an attenuator 300 side, and a negative voltage on a first glass member 110/second glass member 120 side, to thereby join the attenuator 300 and the first glass member 110 at the joint portion 510, and join the attenuator 300 and the second glass member 120 at the joint portion 520 by anodic bonding. In the case of this anodic bonding, an electron flow from the first glass member 110 and the second glass member 120 to the attenuator 300 is generated. It should be noted that the joint portions 510, 520 correspond to the joint portion 500 in FIG. 19A.

Subsequently, as shown in FIG. 19D, a voltage is applied with a positive voltage on the second glass member 120 side, and a positive voltage on the force sensor chip 200 side, to thereby join the first glass member 110 and the force sensor chip 200 at the joint portion 610, and join the second glass member 120 and the force sensor chip 200 at the joint portion 620, by anodic bonding. In the case of this anodic bonding, an electron flow is generated at the joint portion 620 from the second glass member 120 to the force sensor chip 200 (forward voltage), and at the same time, an electron flow e is also generated at the joint portion 610 from the second glass member 120 through the attenuator 300 to the joint portion 510. Since a negative voltage is on the attenuator 300 side and a positive voltage is on the first glass member 110 side, the generated electron flow e means a reverse voltage at the joint portion 510. Because of this reverse voltage, reduction of joint strength, detachment of the joint surface and the like may occur at the joint portion 510, which in turn may cause deterioration in sensor accuracy. It should be noted that the joint portions 610,620 correspond to the joint portion 600 in FIG. 19B.

Therefore, first, it would be desirable to provide a force sensor in which the positioning of the glass member is facilitated when the force sensor chip and the attenuator are joined through the glass member.

Second, it would be desirable to provide a force sensor in which joint strength is prevented from being reduced in a case where the force sensor chip and the attenuator are joined through the glass member by anodic bonding.

SUMMARY OF THE INVENTION

Therefore, in one aspect of the present invention, there is provided the following force sensor.

[1] A force sensor including: a force sensor chip including: an action portion to which an external force is transmitted, a connecting portion which is adjacent to the action portion and on which strain resistive elements are disposed, and a support portion for supporting the action portion and the connecting portion, the force sensor chip for detecting an external force by the strain resistive element; an attenuator including: an input portion to which the external force is input, a fixing portion for fixing the force sensor chip, and a transmission portion for attenuating the external force and transmitting the attenuated external force to the action portion; a first glass member disposed between the action portion and the transmission portion and a second glass member disposed between the support portion and the fixing portion, through which first and second glass members the force sensor chip and the attenuator are joined; and a joint member for joining the first glass member and the second glass member together as a single member.

In the invention according to [1], the joint member is provided that joins the first glass member and the second glass member together as a single member. Therefore, two glass members can be handled as the single glass member and the number of parts can be reduced. As a result, a single positioning of the first glass member, the second glass member or the joint member results in the positioning of both the first glass member and the second glass member, which facilitates the positioning. In addition, since the first glass member and the second glass member can be handled as a single part during a joining operation, joining is facilitated.

[2] The force sensor according to [1], wherein the first glass member and the second glass member are disposed on the same side of the force sensor chip.

In the invention according to [2], the first glass member and the second glass member are disposed on the same side of the force sensor chip. Therefore, the first glass member and the second glass member can be easily joined with a simple configuration.

[3] The force sensor according to [1] or [2], wherein the first glass member and the second glass member are joined to the force sensor chip and the attenuator by anodic bonding.

When the first glass member and the second glass member are joined to the force sensor chip and the attenuator by anodic bonding, the voltage is applied in the same manner to both the first glass member and the second glass member through the joint member. Therefore, a generation of a reverse voltage can be prevented and joint strength can be enhanced.

[4] The force sensor according to any one of [1] to [3], wherein the joint member is a glass member.

Since the first glass member and the second glass member are joined by the glass member, a joined body as a whole can be made of a homogeneous material. Therefore, physical properties, such as thermal conduction coefficient and electric conductivity, become uniform in this joined body. Consequently, an internal stress caused by deformation due to thermal strain and the like can be reduced and ion flux during anodic bonding can be made uniform, leading to stable joint strength. Further, the first glass member, the second glass member and the joint member can be carved out from a single glass material and thus the number of parts, as well as the number of processing steps, can be reduced.

[5] The force sensor according to any one of [1] to [4], wherein the joint member is joined to the first glass member and the second glass member while coming into contact with neither the force sensor chip nor the attenuator.

By providing the joint member so as not to touch the force sensor chip and the attenuator, the first glass member and the second glass member are directly connected to each other, and therefore, leakage of an electric source (bypassing) during anodic bonding, as well as generation of a reverse voltage, can be prevented.

[6] The force sensor according to any one of [1] to [5], wherein the joint members are disposed at symmetrical positions or at equiangular positions with respect to the first glass member or the second glass member.

By arranging the joint members in a balanced manner at symmetrical positions or at equiangular positions with respect to the first glass member and the second glass member, an internal stress caused by deformation due to thermal strain and the like can be reduced. In addition, voltage can be applied to the first glass member and the second glass member in a balanced manner upon anodic bonding, which makes ion flux uniform, leading to stable joint strength.

[7] The force sensor according to any one of [1] to [6], wherein the action portion is disposed on a center portion of the force sensor chip, the support portion is disposed on a peripheral portion of the force sensor chip, and the connecting portion is disposed between the action portion and the support portion.

By disposing the action portion on the center portion of the force sensor chip, disposing the connecting portion on the outer side of the center portion, and disposing the support portion on the peripheral portion of the force sensor, the attenuated external force can be transmitted to the action portion while stably holding the support portion by the attenuator.

[8] The force sensor according to any one of [1] to [7], wherein the joint member has a discontinuous portion formed therein which breaks the joining and blocks a transmission of the external force between the first glass member and the second glass member.

By forming the discontinuous portion which blocks the transmission of the external force between the first glass member and the second glass member, a transmission route of the external force can be simplified. Specifically, the external force is composed exclusively of a force transmitted to the force sensor chip and a force transmitted from the fixing portion of the attenuator to an external system. Therefore, by avoiding a stress concentration caused by the external force transmitted to the glass beam, the first glass member and the second glass member can be prevented from being damaged.

To provide the joint member has advantages in that the number of parts can be reduced, and the positioning of the first and second glass members are facilitated, since the first glass member and the second glass member are joined.

However, after forming a force sensor in which the joint member is sandwiched between the attenuator and the force sensor chip, the joint member becomes unnecessary. Furthermore, there may be a case in which a portion of the external force is applied to the glass beam from the fixing portion of the attenuator through the second glass member. In this case, a stress concentration may occur in the glass beam, and the glass beam, as well as the first and second glass members, may be damaged.

Therefore, in the present invention, by forming the discontinuous portion which blocks the transmission of the external force between the first glass member and the second glass member, an occurrence of the stress concentration is prevented and an internal stress is relieved, to thereby prevent the glass members from being damaged.

In other aspects of the present invention, there are provided the following force sensors.

[9] A method for producing a force sensor including: a force sensor chip including: an action portion to which an external force is transmitted, a connecting portion which is adjacent to the action portion and on which strain resistive elements are disposed, and a support portion for supporting the action portion and the connecting portion, the force sensor chip for detecting an external force by the strain resistive element; an attenuator including: an input portion to which the external force is input, a fixing portion for fixing the force sensor chip, and a transmission portion for attenuating the external force and transmitting the attenuated external force to the action portion; and a glass member including: a first glass member disposed between the action portion and the transmission portion, a second glass member disposed between the support portion and the fixing portion, and a joint member for joining the first glass member and the second glass member together as a single member; the method including: a first anodic bonding step in which the first glass member and the second glass member are joined to the transmission portion and the fixing portion of the attenuator, respectively, to join the glass member and the attenuator; and a second anodic bonding step in which the first glass member and the second glass member are joined to the action portion and support portion of the force sensor, respectively, to join the glass member and the force sensor.

[10] A method for producing a force sensor including: a force sensor chip including: an action portion to which an external force is transmitted, a connecting portion which is adjacent to the action portion and on which strain resistive elements are disposed, and a support portion for supporting the action portion and the connecting portion, the force sensor chip for detecting an external force by the strain resistive element; an attenuator including: an input portion to which the external force is input, a fixing portion for fixing the force sensor chip, and a transmission portion for attenuating the external force and transmitting the attenuated external force to the action portion; and a glass member including: a first glass member disposed between the action portion and the transmission portion, a second glass member disposed between the support portion and the fixing portion, and a joint member for joining the first glass member and the second glass member together as a single member; the method including: a first anodic bonding step in which the first glass member and the second glass member are joined to the action portion and the support portion of the force sensor, respectively, to join the glass member and the force sensor; and a second anodic bonding step in which the first glass member and the second glass member are joined to the transmission portion and the fixing portion of the attenuator, respectively, to join the glass member and the attenuator.

[11] The method for producing a force sensor according to [9] or [10], further including a step of forming a discontinuous portion in the joint member, which blocks a transmission of the external force from the first glass member to the second glass member, after the second anodic bonding step.

By forming the discontinuous portion which blocks a transmission of the external force from the first glass member to the second glass member after the second anodic bonding step, accumulation of the internal stress due to a part of the external force transmitted through the glass beam is avoided, to thereby prevent the first and second glass members from being damaged.

[12] The method for producing a force sensor according to [11], wherein the step of forming discontinuous portion is a step of cutting the joint member with laser beam.

By cutting the joint member with laser beam, a stress on the other members, such as the first and second glass members, which may otherwise be applied thereon during formation of the discontinous portion, can be reduced as low as possible.

Accordingly, first, in the force sensor and the method for producing the same according to the present invention, the positioning of the glass member can be facilitated when the force sensor chip and the attenuator are joined through the glass member.

Second, in the force sensor and the method for producing the same according to the present invention, joint strength can be prevented from being reduced in a case where the force sensor chip and the attenuator are joined through the glass member by anodic bonding.

The various aspects, other advantages and further features of the present invention will become more apparent by describing in detail illustrative, non-limiting embodiments thereof with reference to the accompanying drawings.

BRIEF DESCRIPTION OF DRAWINGS

FIGS. 1A and 1B illustrate a schematic framework of a force sensor according to the present invention, in which FIG. 1A is an external perspective view and FIG. 1B is a cross-sectional perspective view showing an inner structure.

FIGS. 4A and 4B illustrate a configuration of the glass member according to a first embodiment of the present invention, in which FIG. 4A shows a plan view, and FIG. 4B shows a cross-sectional view.

FIGS. 11A and 11B explain a deformed state of strain resistive elements when an external force Fx in an X-axis direction is transmitted to the action portion, in which FIG. 11A is a plan view, and FIG. 11B is a plan view showing a deformed state of the strain resistive elements.

FIGS. 12A and 12B explain a deformed state of strain resistive elements when an external force Fz in a Z-axis direction is transmitted to the action portion, in which FIG. 12A is a plan view, and FIG. 12B is a cross-sectional view showing a deformed state of the strain resistive elements.

FIGS. 13A and 13B explain a deformed state of strain resistive elements when a moment My about a Y-axis is applied, in which FIG. 13A is a plan view, and FIG. 13B is a cross-sectional view showing a deformed state of the strain resistive elements.

FIGS. 14A and 14B explain a deformed state of strain resistive elements when a moment Mz about the Z-axis is applied, in which FIG. 14A is a plan view, and FIG. 14B is a plan view showing a deformed state of the strain resistive elements.

FIGS. 15A and 15B illustrate a configuration of a glass member of a force sensor according to a second embodiment of the present invention, in which FIG. 15A shows a plan view, and FIG. 15B shows a cross-sectional view.

FIGS. 18A and 18B illustrate a configuration of a glass member of a force sensor according to a third embodiment of the present invention, in which FIG. 18A shows a plan view, and FIG. 18B shows a cross-sectional view.

FIGS. 19A-D illustrate steps of conventional anodic bonding, in which FIG. 19A shows joining of a glass plate and an attenuator, FIG. 19B shows joining of the attenuator with the glass plate joined thereto and a force sensor chip, FIGS. 19C and 19D are cross sectional views showing a case where anodic bonding is applied to a specific attenuator, in which FIG. 19C shows joining of the glass plate and the attenuator, and FIG. 19D shows joining of the attenuator with the glass plate joined thereto and the force sensor chip.

DETAILED DESCRIPTION OF THE PREFERRED EMBODIMENTS

Figure 1A:
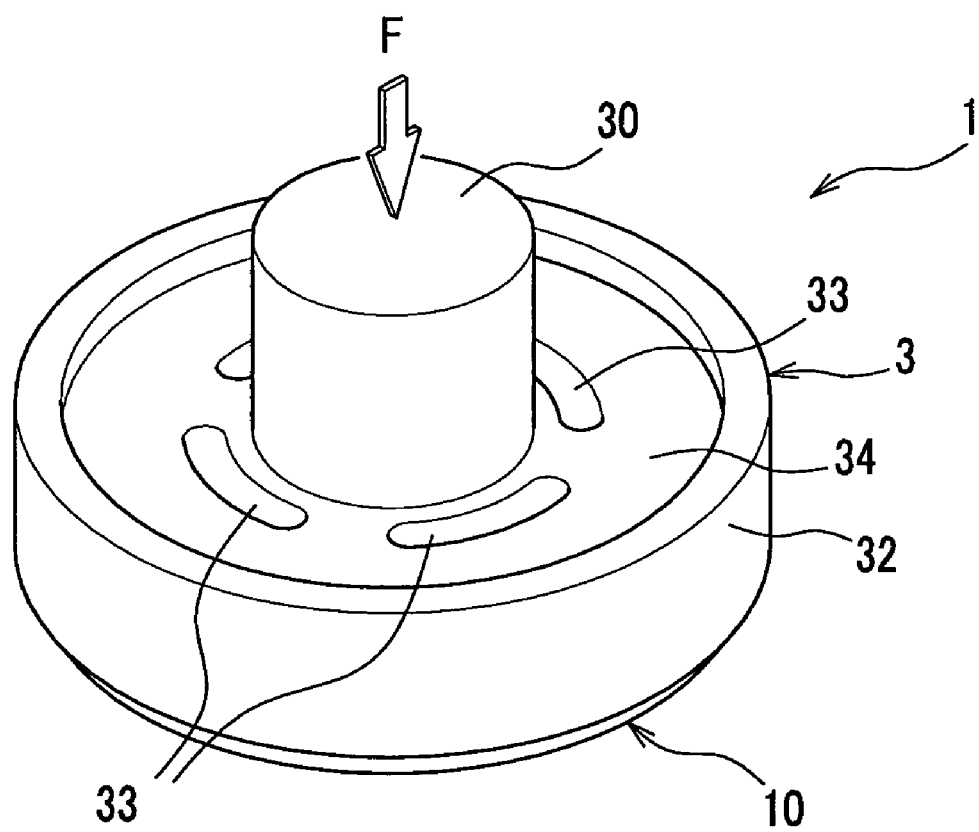
Figure 1B:
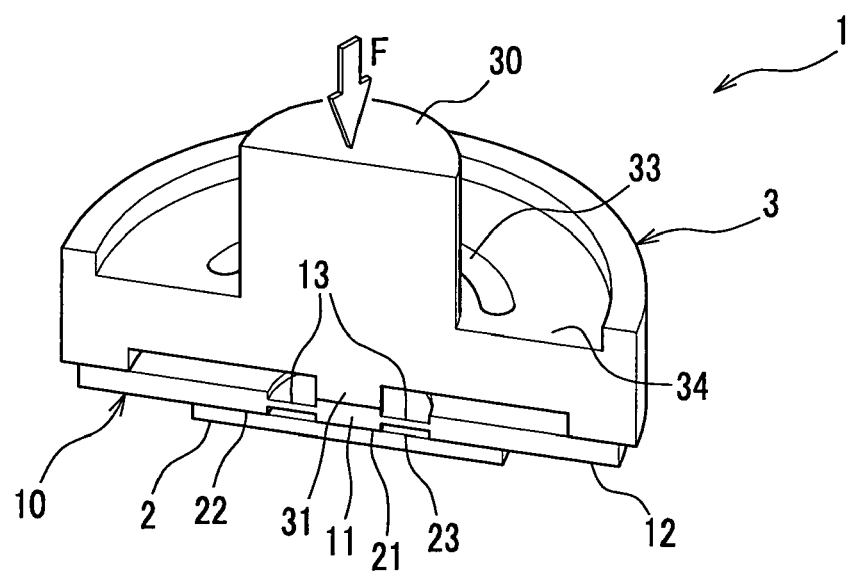
Figure 1B:
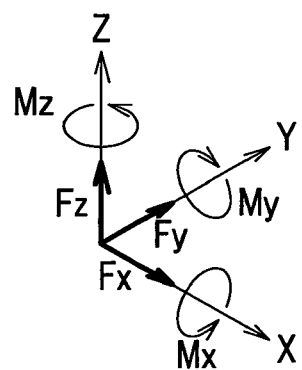
Figure 2:
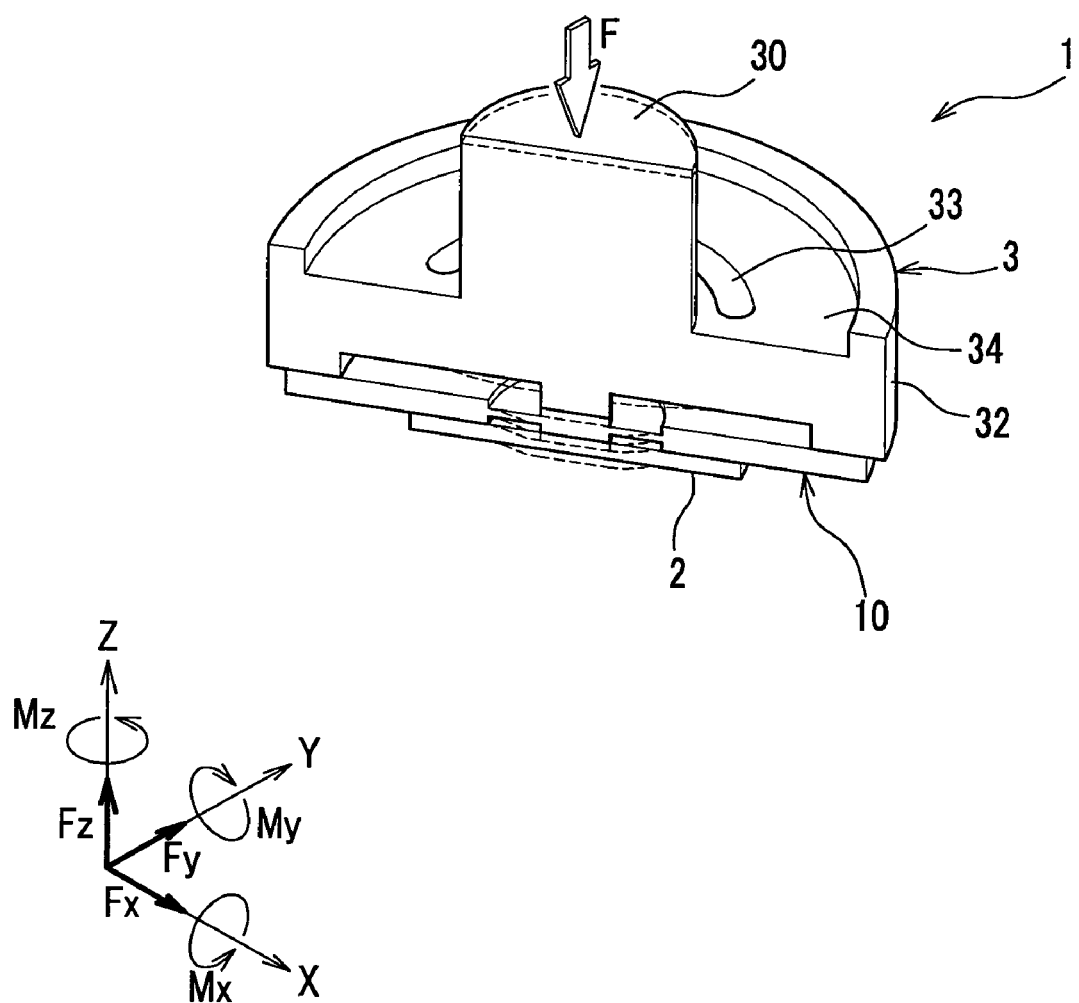
FIG. 2 is a cross-sectional perspective view diagrammatically showing a state in which an external force is attenuated and transmitted to a force sensor chip.
Figure 3:
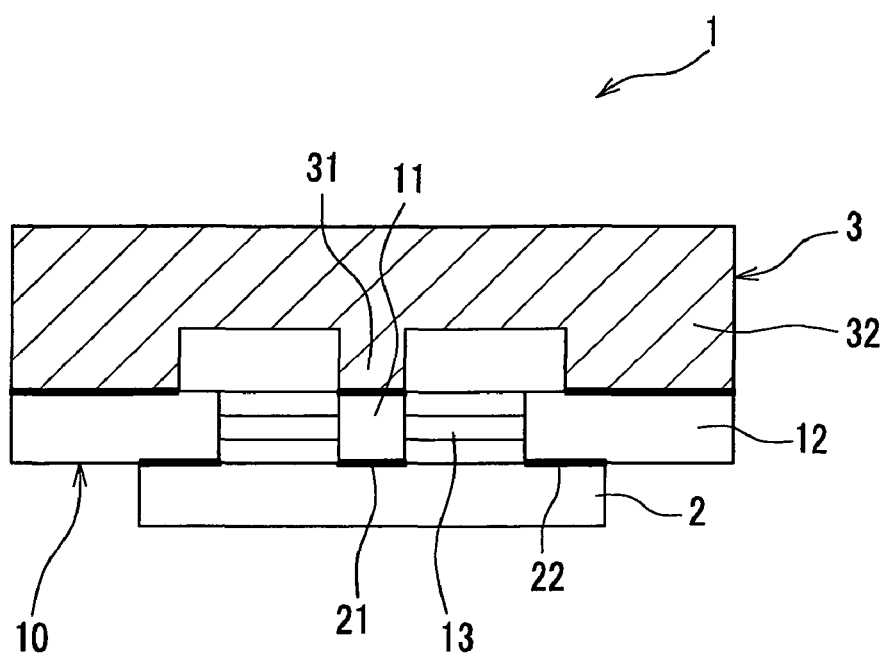
FIG. 3 is a cross-sectional view diagrammatically showing a connection state of a glass member according to a first embodiment of the present invention.

An entire framework of a force sensor according to a first embodiment of the present invention will be describer in detail with reference to FIGS. 1-3.

It should be noted that in the drawings to be referred, for the purpose of convenience in explanation, an attenuator, a glass beam and the like are simplified, and configurations and positional relationships may be schematically and conceptually expressed. In addition, in the drawings, degree of strain and the like may be exaggeratingly expressed.

A force sensor 1 according to the present invention is configured in a shape of a circular plate with an input portion 30 protruding therefrom (see FIG. 1A), and includes a force sensor chip 2 for detecting hexaxial components of a transmitted external force F (see FIG. 1B) and an attenuator 3 for fixing the force sensor chip 2, attenuating the external force F and transmitting the attenuated external force F to the force sensor chip 2. The force sensor chip 2 and the attenuator 3 are joined through a glass member 10 (see FIGS. 4 and 5 for details).

Herein, for the force sensor 1 according to the present invention, a hexaxial force sensor that can detect a force and a moment of the external force F in terms of hexaxial components will be exemplified. Specifically, the force components with respect to directions of an X-axis, a Y-axis and a Z-axis orthogonal to each other are defined as Fx, Fy and Fz, respectively. The moment components with respect to the X-axis, the Y-axis and the Z-axis are represented as Mx, My and Mz, respectively.

It should be noted that, though the hexaxial force sensor is exemplified in the present embodiment, the present invention is not limited by the number of detection axes of the force sensor, size of an external force, or the like.

As shown in FIG. 1B, the force sensor chip 2 is in a shape of an approximate square as a plan view (also see FIG. 7), and includes: an action portion 21 to which the external force F attenuated by the attenuator 3 is transmitted from a transmission portion 31 of the attenuator 3; a support portion 22 for supporting the action portion 21; a connecting portion 23 for connecting the action portion 21 and the support portion 22.

The attenuator 3 includes the input portion 30 to which the external force F is input; the transmission portion 31 for attenuating the external force F input to the input portion 30 and transmitting the attenuated external force F to the action portion 21 of the force sensor chip 2; a fixing portion 32 for fixing the force sensor chip 2; and a disc portion 34 for connecting the fixing portion 32 and the input portion 30. In the disc portion 34, buffer holes 33 each in a shape of arcwise-curved oblong circle are formed.

The glass member 10 is joined to a lower face of the fixing portion 32 and a lower face of the transmission portion 31 of the attenuator 3. The force sensor chip 2 is fixed to the lower face of the attenuator 3 through the glass member 10.

In the present embodiment, as described above, the attenuator 3 is joined to the force sensor chip 2 at the fixing portion 32 for fixing the force sensor chip 2 and at the transmission portion 31 for transmitting the external force F, on the same side of the force sensor chip 2 (upper face side in the drawing). Due to this configuration, a whole body of the force sensor 1 can be made compact.

In the present embodiment, the attenuator 3 is made of a stainless steel material. However, other metal materials, such as aluminum and carbon steel, can be also used.

By providing the disc portion 34 that connects the fixing portion 32 and the input portion 30, the external force F applied to the input portion 30 is received mainly by the fixing portion 32, and then transmitted outward, as shown in FIG. 2. By providing the buffer holes 33 in the disc portion 34, the input portion 30 is deformed in a direction of the external force F, which attenuates the external force F and a part thereof is transmitted from the input portion 30 through the transmission portion 31 to the action portion 21 of the force sensor chip 2 (also see FIG. 3).

In this manner, by properly adjusting the number and shape of the buffer holes 33 in the attenuator 3, even though the applied external force F exceeds a proof stress of the force sensor chip 2, an appropriately attenuated force is applied to the force sensor chip 2 and the external force F can be detected with high accuracy with steady balance.

As shown in FIG. 3, the force sensor chip 2 and the attenuator 3 are joined by anodic bonding, through the glass member 10. Specifically, an upper face (in the drawing) of the glass member 10 is joined to the attenuator 3 by anodic bonding, and a lower face of the glass member 10 is joined to the force sensor chip 2 by anodic bonding.

Figure 4A:
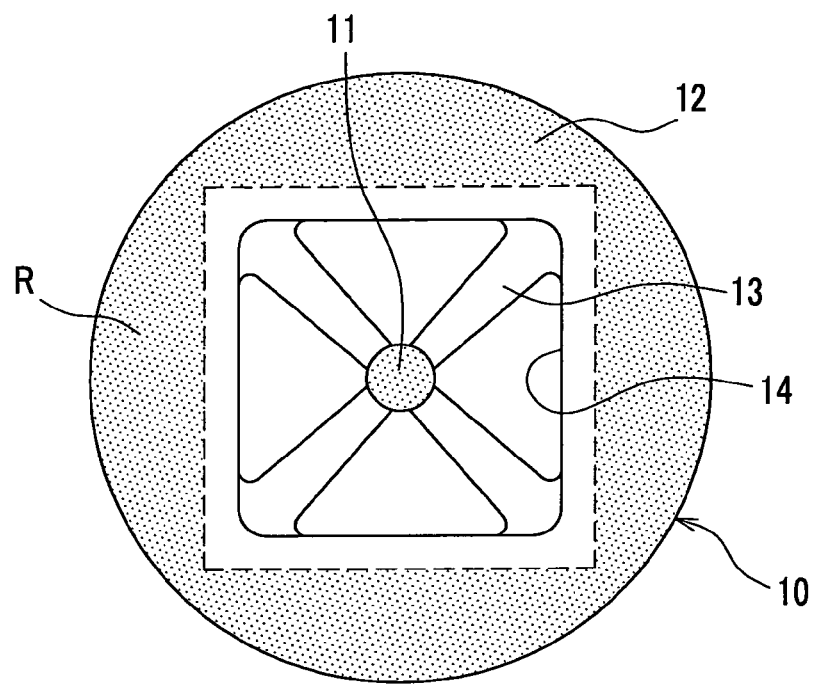

As shown in FIG. 4A, the glass member 10 as a whole is in a shape of a circular plate, and includes: a first glass member 11 disposed at a center of the glass member 10; a second glass member 12 disposed along a rim of the glass member 10; and a glass beam 13 as a joint member for integrally joining the first glass member 11 and the second glass member 12.

The first glass member 11, the second glass member 12 and the glass beam 13 are mechanically carved out as a single glass member from a single glass material. Therefore, the glass member as a whole can be made of a homogeneous material, and secures rigidity. Moreover, at the joint portions between the first glass member 11 and the glass beam 13, and between the second glass member 12 and the glass beam 13, no members, such as adhesive, are present and therefore, upon anodic bonding, flow of alkali ion, such as $Na^+$, can be made smooth and adverse effect, such as thermal strain due to mixture of dissimilar materials, can be prevented.

It should be noted that the glass member 10 may be obtained by a technique other than carving out.

Figure 4B:
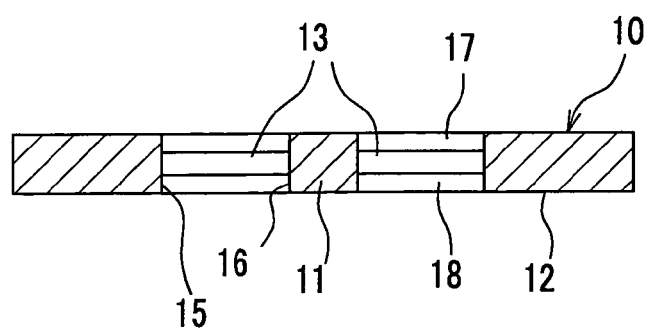

As shown in FIGS. 4A and 4B, the first glass member 11 disposed at the center of the glass member 10 is configured in a shape of a column which corresponds to the shape of the transmission portion 31 of the attenuator 3 (see FIG. 3). An upper face of the first glass member 11 is joined to the transmission portion 31 of the attenuator 3 by anodic bonding, and a lower face thereof is joined to the action portion 21 of the force sensor chip 2 (see FIG. 3) by anodic bonding. It should be noted that a planar surface area of the first glass member 11 may be slightly larger than that of the transmission portion 31. With this configuration, even when the glass member 10 and the attenuator 3 are not precisely aligned, the entire face of the transmission portion 31 secures anodic bonding.

It should be noted that the first glass member 11 may not be in a shape of a column, and may be in a shape of a truncated cone, i.e. a trapezoid when seen from a side. By selecting the larger joint surface from two (upper and lower) joint surfaces of the first glass member 11 in a shape of truncated cone and joining the larger joint surface with the attenuator 3, a joint surface area is secured and total joint strength is enhanced.

The second glass member 12 is in a shape of a circular plate having a through-hole 14 in an approximate square positioned at a center of the second glass member 12. The through-hole 14 is shaped so as to correspond to a shape of the connecting portion 23 of the force sensor chip 2 (see FIGS. 1 and 8). In other words, an area of a lower face of the second glass member 12 surrounding the through-hole 14 as a joint portion is joined to the support portion 22 of the force sensor chip 2 (see FIG. 3) by anodic bonding. In addition, an area of an upper face of the second glass member 12 as a joint portion (dotted region R shown in FIG. 4A) is joined to the fixing portion 32 of the attenuator 3 (see FIG. 3) by anodic bonding. Since a planar surface area of the second glass member 12 is made somewhat larger than that of the fixing portion 32, even though the fixing portion 32 and the second glass member 12 are not precisely aligned upon joining, they can be securely joined to each other at their joint region with a sufficient area by anodic bonding (see FIG. 3).

The glass beam 13 is a member having a function of beam that integrally joins the first glass member 11 and the second glass member 12, as shown in FIGS. 4A and 4B.

Specifically, the glass beam 13 connects an outer periphery 16 of the first glass member 11 and an inner periphery 15 of the second glass member 12. The glass beam 13 is in a shape of a plate, and a thickness thereof is made thinner than those of the first glass member 11 and the second glass member 12. As a result, spaces 17, 18 are formed in such a manner that the upper face and lower face of the glass beam 13 do not protrude from the upper faces and lower faces, respectively, of the first glass member 11 and the second glass member 12.

It should be noted that, though in the present embodiment the glass beam 13 is in a shape of a plate, the glass beam 13 may be in a shape of a column, and arranged to form a grid. In short, any number and shape can be adopted for the glass beam 13, as long as the glass beam 13 integrally connects the first glass member 11 and the second glass member 12, and rigidity is secured while workability and the like are secured at the same time.

Figure 5:
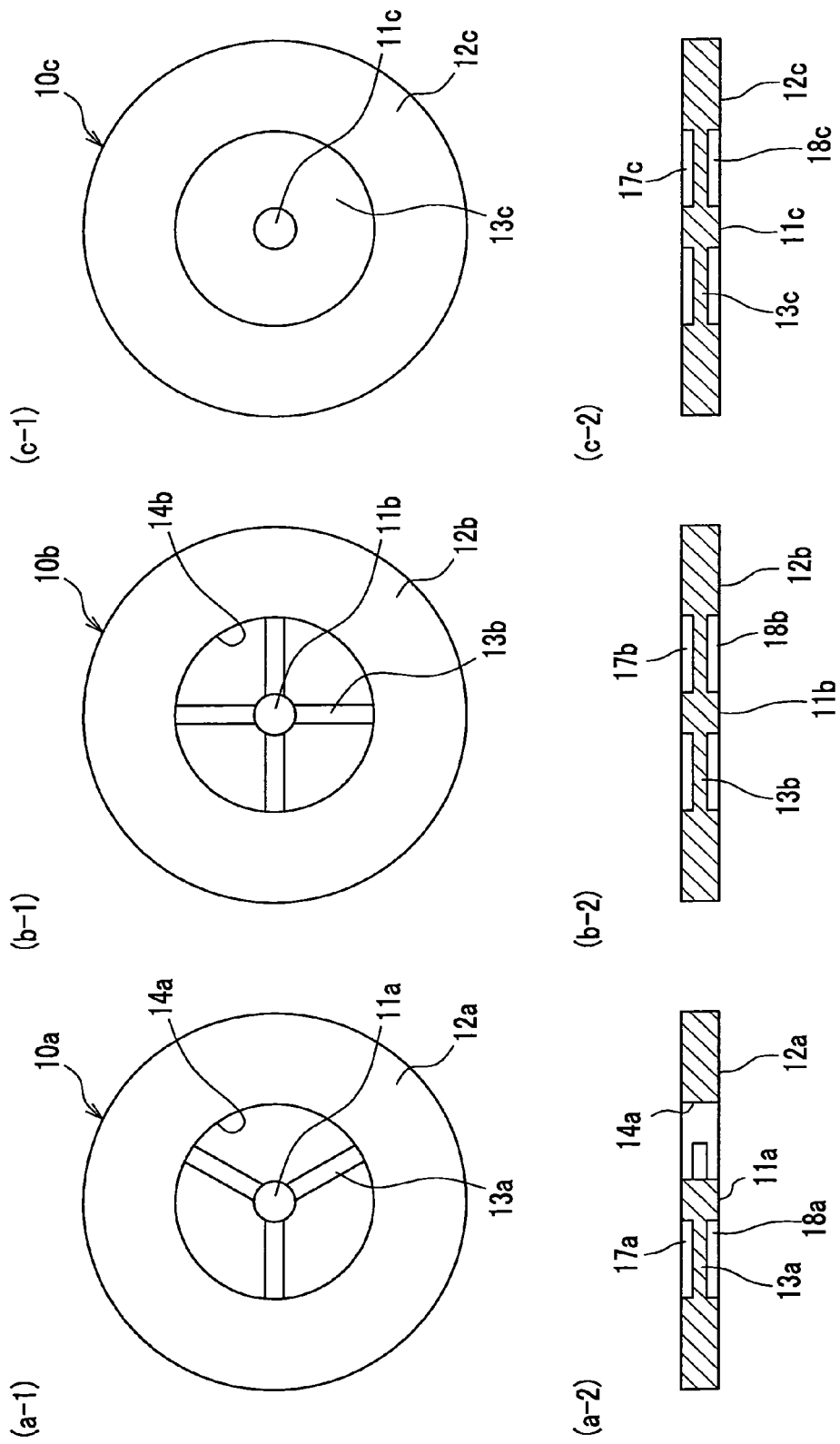
FIG. 5 illustrates other configurations of the glass member according to embodiments of the present invention, in which (a1)-(c1) show plan views, and (a2)-(c2) show cross-sectional views.

Other configurations of the glass member 10 will be described with reference to FIG. 5. FIG. 5 illustrates other configurations of the glass member, in which (a-1)-(c-1) show plan views, and (a-2)-(c-2) show cross-sectional views.

As shown in (a-1)-(c-1) of FIG. 5, first glass members 11a, 11b, 11c of glass members 10a, 10b, 10c, respectively, are in a shape of a circular plate as in the first glass member 11. On the other hand, second glass members 12a, 12b, 12c are different from the second glass member 12 in that inner peripheries are in a shape of circle. A shape of the glass member can be appropriately determined so that anodic bonding is securely obtained in accordance with the joint surface between the attenuator 3 and the force sensor chip 2.

Also for the glass beam 13, various configurations can be appropriately adopted.

Specifically, in a case of the glass member 10a shown in (a-1) and (a-2) of FIG. 5, glass beams 13a, 13a, 13a are in a trisectional arrangement at an interval of 120 degrees along a circumference of the first glass member 11a.

In the glass member 10b shown in (b-1) and (b-2) of FIG. 5, glass beams 13b, 13b, 13b, 13b are in a quadrisectional arrangement at an interval of 90 degrees along a circumference of the first glass member 11b.

In the glass member 10c shown in (c-1) and (c-2) of FIG. 5, the second glass member 12c does not have through-holes similar to the through-holes 14a, 14b of the glass members 10a, 10b, respectively (see (a-1) and (b-1) of FIG. 5), and a glass beam 13c in a shape of a circular plate is disposed between the first glass member 11c and the second glass member 12c without forming a gap.

For the glass members 10a, 10b, 10c, like in the glass beam 13 of the embodiment above (see FIG. 4B), spaces 17a, 17b, 17c and spaces 18a, 18b, 18c are formed in such a manner that the upper faces and the lower faces of the glass beams 13a, 13b, 13c do not protrude from the upper faces and the lower faces, respectively, of the first glass members 11a, 11b, 11c and the second glass members 12a, 12b, 12c. With this configuration, anodic bonding of the force sensor chip 2 and the attenuator 3 is prevented from being hindered.

In the force sensor 1 according to the present embodiment, the following effects can be obtained by providing the glass beam 13 (hereinafter including the glass beams 13a, 13b, 13c) that integrally joins the first glass member 11 and the second glass member 12 as described above.

In the glass member 10 (hereinafter including the glass members 10a, 10b, 10c), by integrally joining the first glass member 11 and the second glass member 12 through the glass beam 13, the glass members 11, 12 which may otherwise be as two separate parts can be handled as a single part, the glass member 10. As a result, with a single positioning of any one of the first glass member 11, the second glass member 12 and the glass beam 13, the first and second glass members 11, 12 can be joined to the force sensor chip 2 or the attenuator 3 at the same time. In other words, the number of positioning process and joint process can be reduced. Especially, there is no need to conduct the positioning of the extremely small first glass member 11 alone, and thus accuracy in the positioning can be enhanced.

In addition, since the transmission portion 31 of the attenuator 3 and the force sensor chip 2 of the fixing portion 32 is provided on the same side, the force sensor 1 can be made thinner, assembling process can be simplified, and accuracy can be enhanced.

Figure 19A:
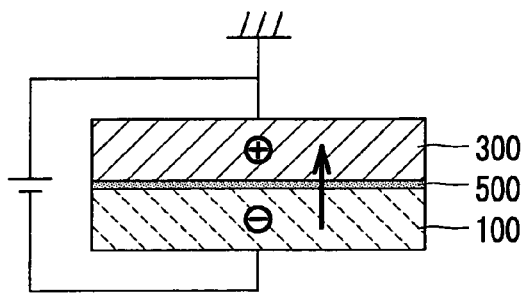
Figure 19B:
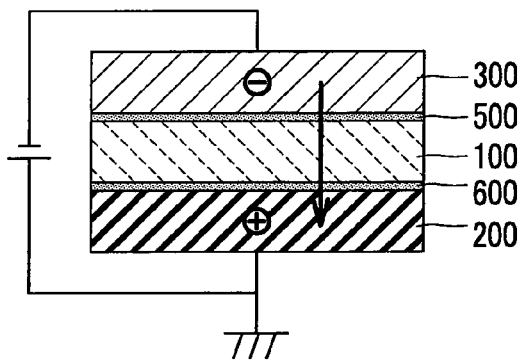
Figure 19C:
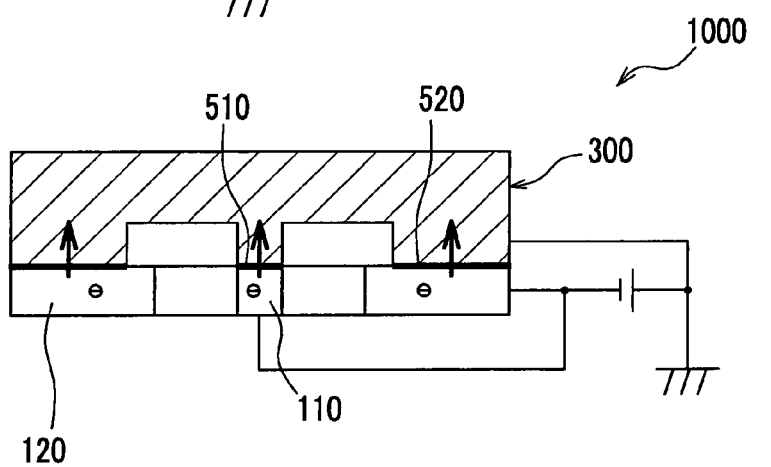
Figure 19D:
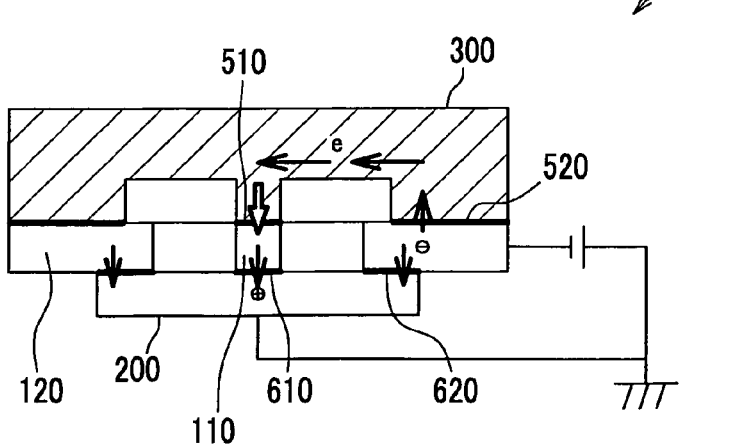

In the present invention, unlike the prior art explained with reference to FIGS. 19A and 19B, a reverse voltage never occurs in the joint portion between the transmission portion of the attenuator and the first glass member. In this regard, an explanation will be made with reference to FIGS. 6A and 6B.

Figure 6A:
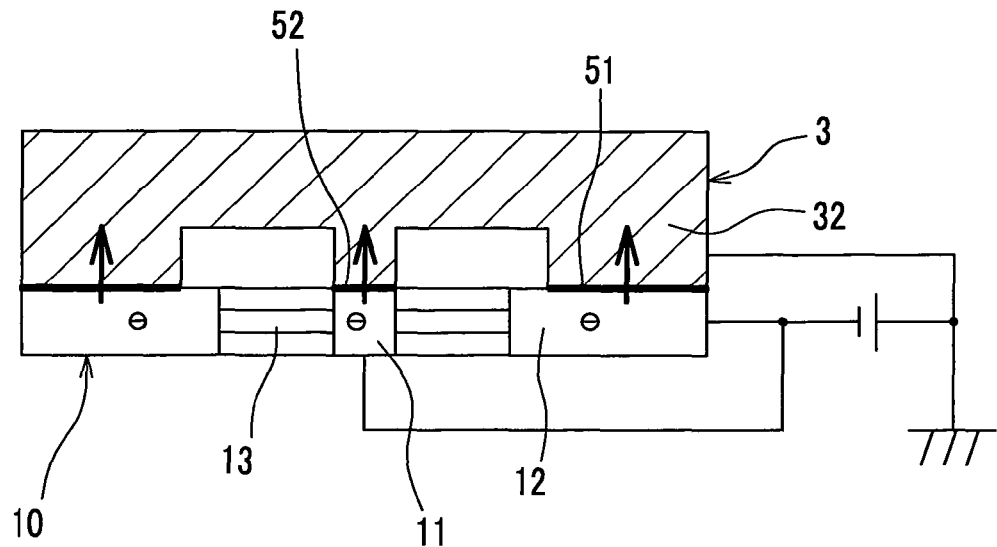
FIG. 6A is a cross-sectional view showing a direction of voltage application during anodic bonding of the attenuator and the glass member of the force sensor according to an embodiment of the present invention.
Figure 6B:
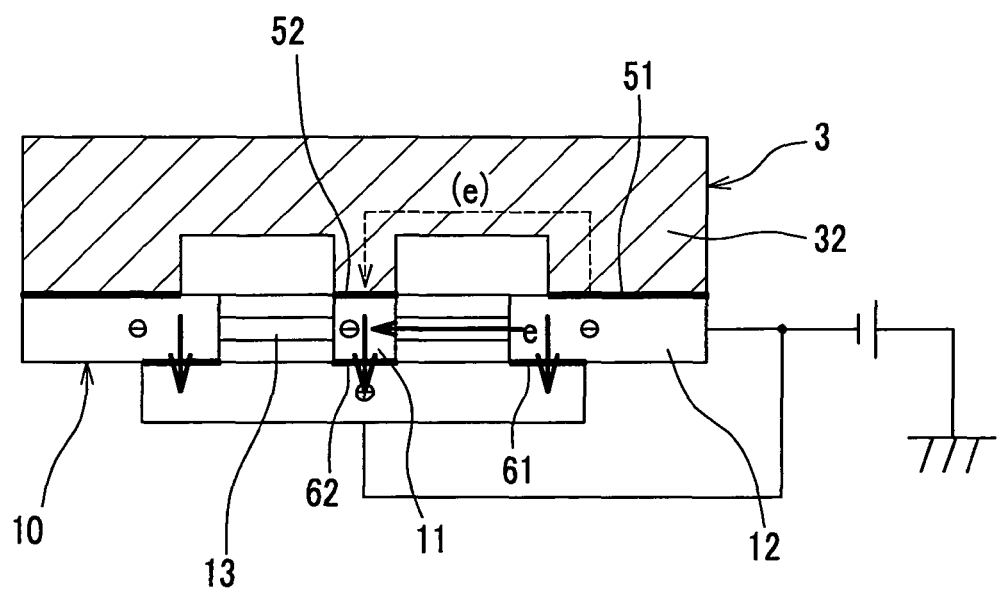
FIG. 6B is a cross-sectional view showing a direction of voltage application during anodic bonding of the glass member and the force sensor chip.

FIG. 6A is a cross-sectional view showing a direction of voltage application during anodic bonding of the attenuator and the glass member, and FIG. 6B is a cross-sectional view showing a direction of voltage application during anodic bonding of the glass member and the force sensor chip.

As shown in FIG. 6B, the first and second glass members 11, 12 become nearly equipotential due to a presence of the glass beam 13, and a direction of voltage application at a joint portion 52 does not become opposite to the direction during a process of FIG. 6A. In other words, an electron e does not flow in an opposite direction in the joint portion 52 between the processes of FIGS. 6A and 6B. As a result, in the force sensor 1 according to the present embodiment, defects, such as reduction of joint strength and detachment of the joint portion 52, caused by the application of a reverse voltage can be prevented.

In the present embodiment, the first the attenuator 3 and the glass member 10 are joined at joint portions 51, 52 by anodic bonding, and then the glass member 10 and the force sensor chip 2 are joined at the joint portions 61, 62 by anodic bonding. However, the present invention is not limited to the present embodiment, and it is also possible that first the glass member 10 and the force sensor chip 2 are joined at the joint portions 61, 62 by anodic bonding, and then the attenuator 3 and the glass member 10 are joined at the joint portions 51, 52 by anodic bonding, which likewise prevents occurrence of the reverse voltage at the joint portion.

In addition, since the first glass member 11, the second glass member 12 and the glass beam 13 are formed from a single glass member made of a single glass material, the glass member 10 as a whole can be made of a homogeneous material. Therefore, physical properties, such as thermal conduction coefficient and electric conductivity, become uniform in the glass member 10. Consequently, an internal stress caused by deformation due to thermal strain and the like can be reduced and ion flux during anodic bonding can be made uniform, leading to stable joint strength. Further, the first glass member 11, the second glass member 12, and the glass beam 13 can be, for example, carved out from a single glass material and thus the number of the processing steps can be reduced. It should be noted that the glass member 10 may be obtained by other techniques.

Figure 7:
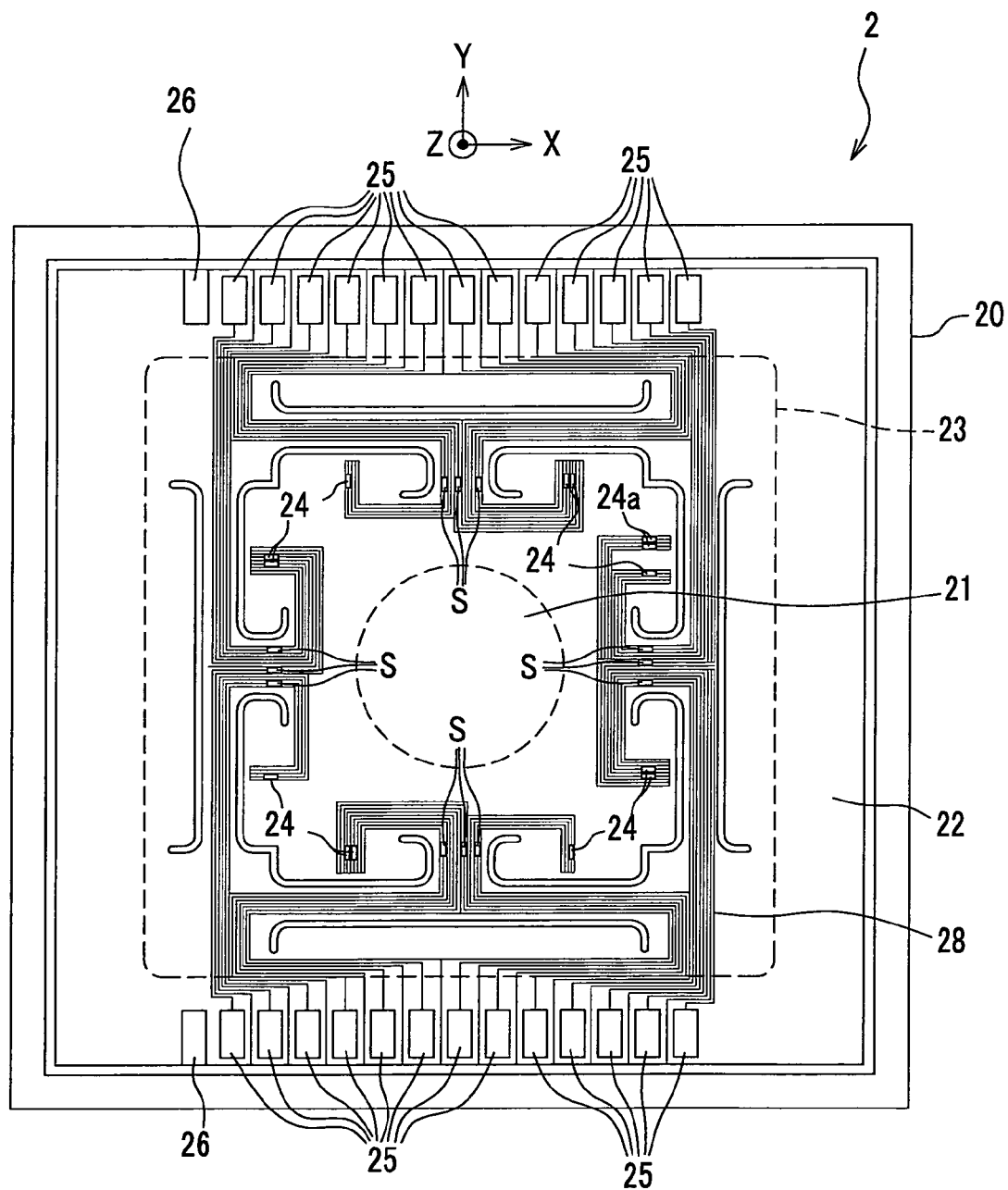
FIG. 7 is a plan view illustrating a schematic framework of a force sensor chip according to an embodiment of the present invention.
Figure 8:
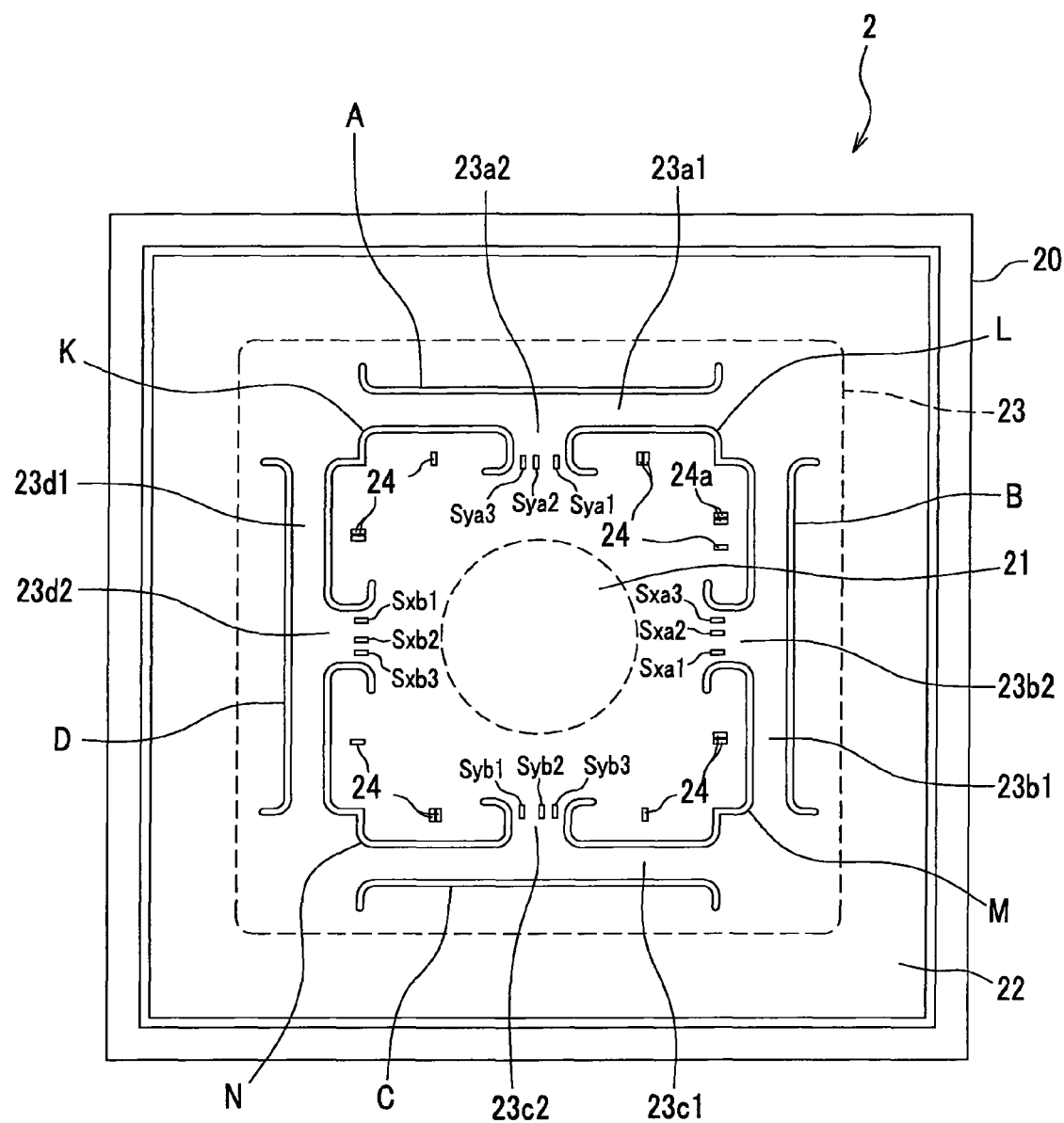
FIG. 8 is a plan view explaining details of a main part of a force sensor chip according to an embodiment of the present invention.

Next, the force sensor chip 2 will be explained with reference to FIGS. 7 and 8. FIG. 7 is a plan view for explaining outline of a force sensor chip. FIG. 8 is a plan view showing a main part for explaining details of a force sensor chip according to an embodiment of the present invention. As shown in FIG. 7, the force sensor chip 2 is formed on a semiconductor substrate 20 having an approximate square shape as a plan view, and includes: the action portion 21 to which the external force F (see FIGS. 1A and 1B) is transmitted; the connecting portion 23 which is adjacent to the action portion 21 and has resistive elements, such as strain resistive elements S and temperature compensating resistive elements 24, disposed at specific positions; and the support portion 22 for supporting the action portion 21 and the connecting portion 23. Through wirings 28, the strain resistive elements S and the temperature compensating resistive elements 24 are connected to signal electrode pads 25 and GND electrode pads 26, which is for connecting with external devices (not shown) that measure resistance value.

In the force sensor chip 2, the action portion 21 is disposed at a center, and the transmission portion 31 of the attenuator 3 is joined to the action portion 21 with the first glass member 11 sandwiched therebetween (see FIG. 1B).

As shown in FIG. 8, the connecting portion 23 is a region for connecting the action portion 21 and the support portion 22. At specific positions therein, through-holes A-D, K-N each in a shape of a long and narrow slit are formed. The connecting portion 23 has beam-like elastic portions 23a1, 23b1, 23c1, 23d1 each having two ends connected to the support portion 22, and bridge portions 23a2, 23b2, 23c2, 23d 2 contiguously formed with the respective elastic portions 23a1, 23b1, 23c1, 23d1 at center portions thereof, so as to form T-shape. On the bridge portions 23a2, 23b2, 23c2, 23d2, the strain resistive elements S (Sxa1-Sxa3, Sxb1-Sxb3, Sya1-Sya3, Syb1-Syb3) are disposed. At specific positions relative to the strain resistive elements S and the through-holes A-D, K-N, there are provided the temperature compensating resistive elements 24 for correcting strain of the strain resistive elements S, and the resistive elements 24a for monitoring whether or not the temperature compensating resistive elements 24 are properly functioning.

The support portion 22 forms a periphery of the force sensor chip 2 and is disposed outside the linear through-holes A-D formed in the connecting portion 23. The whole or a part of the support portion 22 is joined to the fixing portion 32 of the attenuator 3 with the second glass member 12 sandwiched therebetween (see FIG. 1B).

As shown in FIG. 8, the strain resistive element S is a rectangular active layer (diffuse layer) formed on a surface (upper layer) of a semiconductor substrate 20, in such a manner that, when the external force is applied in a longitudinal direction of the strain resistive element S, and the strain resistive element S is deformed (not shown), resistance thereof changes.

Three strain resistive elements S forms one group and four groups are disposed on their respective bridge portions 23a2, 23b2, 23c2, 23d 2 which are equally distant from the action portion 21. Specifically, on the bridge portions 23b2, 23d 2 in the X-axis direction, a group of strain resistive elements Sxa1-Sxa3 and a group of strain resistive elements Sxb1-Sxb3 are symmetrically arranged with the action portion 21 as a symmetry center. In addition, on the bridge portions 23a2, 23c2 in the Y-axis direction, a group of strain resistive elements Sya1-Sya3 and a group of strain resistive elements Syb1-Syb3 are symmetrically arranged with the action portion 21 as a symmetry center.

The strain resistive elements Sxa1-Sxa3, Sxb1-Sxb3, Sya1-Sya3, Syb1-Syb3 are arranged so that the longitudinal direction of each of them aligns with a direction towards the action portion 21 (either X-axis direction or Y-axis direction).

The through-holes A-D, K-N include the through-holes A, B, C, D, each in a linear shape and the through-holes K, L, M, N each in a form of an L-shaped hook. Positions of the corners of the L-shaped through-holes K, L, M, N coincide with corners of a square, and the through-holes A-D, K-N are arranged to form an approximate square as a whole around the action portion 21.

Specifically, the through-hole K is formed between the strain resistive elements Sxb1-Sxb3 and the strain resistive elements Sya1-Sya3. The through-hole L is formed between the strain resistive elements Sya1-Sya3 and the strain resistive elements Sxa1-Sxa3. The through-hole M is formed between the strain resistive elements Sxa1-Sxa3 and the strain resistive elements Syb1-Syb3. The through-hole N is formed between the strain resistive elements Syb1-Syb3 and the strain resistive elements Sxb1-Sxb3. On the other hand, the linear through-holes A, B, C, D are formed outside the through-holes K, L, M, N. With these through-holes A-D, K-N, a strain in accordance with the applied external force F (see FIG. 1A) is intensively appeared at the portions where the strain resistive elements S are disposed, while the strain is not generated at the portions where the temperature compensating resistive elements 24, 24a are disposed.

With this configuration of the through-holes A-D, K-N, the rims of the connecting portion 23 facing the through-holes A-D, K-N are freely movable without suffering a stress, and therefore, even when the external force F (see FIG. 1A) is applied to the action portion 21, a tensile force and a compressive force by the external force F do not act on these free ends.

On the other hand, on the bridge portions 23a2-23d 2 and the elastic portions 23a1-23d1, especially at a position where the strain resistive elements S are disposed, and on the connect portions of the support portion 22 with the elastic portions 23a1-23d1, a tensile force and a compressive force act in specific directions.

In the present embodiment, the linear through-holes A-D and the hook-shaped through-holes K-N are arranged in a shape of an approximate square, and the strain resistive elements S and the temperature compensating resistive elements 24, 24a are disposed while the strain distribution generated by the through-holes A-D, K-N are taken into account. However, the present invention is not limited to the present embodiment, and the through-holes A-D, K-N may be arranged, for example, in a form of a circle or the like, while the axial force (axial component) and the moment to be detected are taken into account.

The temperature compensating resistive element 24 is the same resistive element as the strain resistive element S, and twelve temperature compensating resistive elements 24 are disposed at specific positions on the semiconductor substrate 20 corresponding to twelve strain resistive elements Sxa1-Sxa3, Sxb1-Sxb3, Sya1-Sya3, Syb1-Syb3.

The temperature compensating resistive element 24 is disposed at a position where the temperature condition is the same as the strain resistive element S which is a subject of temperature compensation, and where no strain by the applied external force F acts on. In other words, the temperature compensating resistive elements 24 are disposed in the vicinity of their respective strain resistive elements S, and in the vicinity of an inner rim of the respective free ends facing the through-holes K, L, M, N.

Since the temperature compensating resistive elements 24 are disposed at positions on the force sensor chip 2 where the resistance value changes only by temperature conditions, a resistance value under no influence of ambient temperature can be obtained by eliminating a change in the resistance value due to a temperature change from a change in the resistance value of the strain resistive element S.

Specifically stated, a bridged circuit is composed of the temperature compensating resistive element 24 and the strain resistive element S, and by comparing the change in the resistance value due to the temperature change of the strain resistive element S and the external force F (FIG. 1A), with the change in the resistance value of the temperature compensating resistive element 24, exclusively the change in the resistance value by the external force F in the strain resistive element S is taken out and detected.

It should be noted that the resistive elements 24a (strain resistive element) for monitoring are disposed in such a manner that a zero output state in which no stress is generated can be confirmed at all times.

Figure 9A:
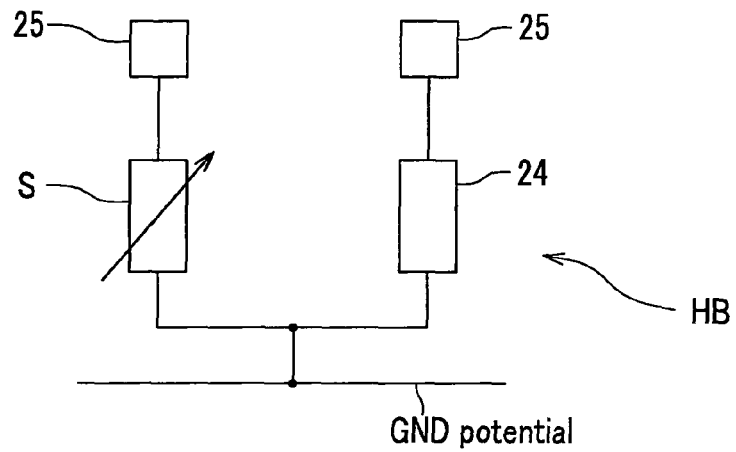
FIG. 9A is an electric circuit diagram showing a half-bridged circuit for illustrating a relation of electrical connection between a strain resistive element and a temperature compensating resistive element in the force sensor chip according to the present invention.
Figure 9B:
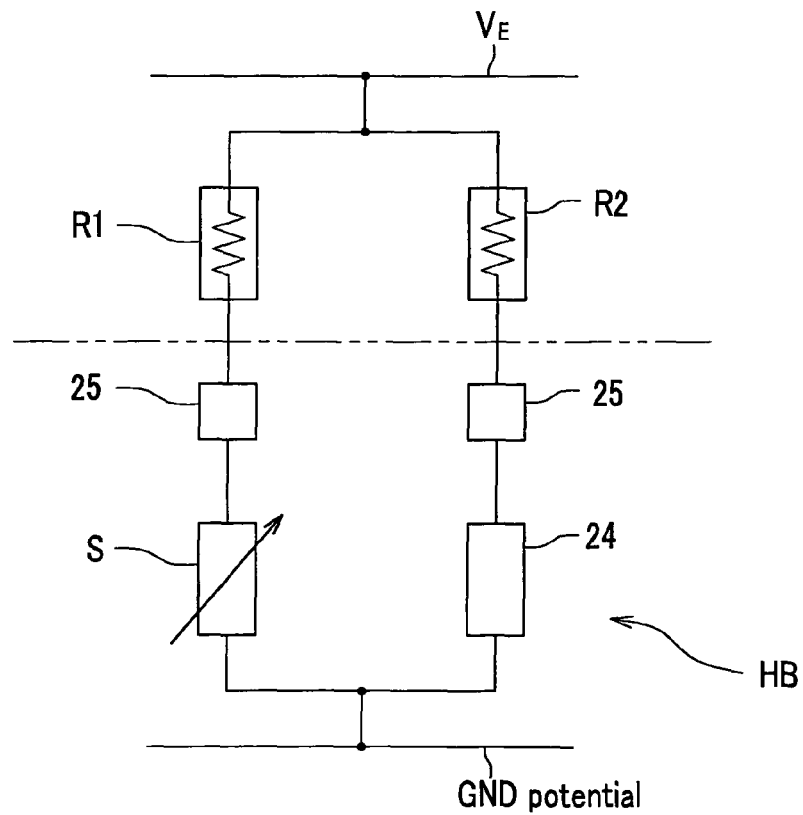
FIG. 9B is an electric circuit diagram showing a full-bridged circuit in which external resistances are added to the force sensor chip according to the present invention.

Herein, a relation of electrical connection between the strain resistive element S and the corresponding temperature compensating resistive element 24 will be described with reference to FIGS. 9A and 9B. FIG. 9A is an electric circuit diagram showing a half-bridged circuit for illustrating a relation of electrical connection between a strain resistive element and a temperature compensating resistive element in the force sensor chip according to the present invention, and FIG. 9B is an electric circuit diagram showing a full-bridged circuit in which external resistances are added to the force sensor chip according to the present invention.

In general, a full-bridged circuit is formed in the force sensor chip. However, it is also possible to have a half-bridged circuit and an external resistance added thereto to constitute a full-bridged circuit as a whole. The present embodiment adopts the latter configuration.

The strain resistive element S in the force sensor chip 2 according to the present invention (see FIG. 7) and the temperature compensating resistive element 24 for temperature compensation in accordance with the strain resistive element S forms a half-bridged circuit HB that corresponds to a lower half of the bridged circuit, as shown in FIG. 9A.

Specifically, in the half-bridged circuit HB, one end of the strain resistive element S and one end of the temperature compensating resistive element 24 (lower ends in the drawing) are connected to each other, which are then connected to a GND potential through the GND electrode pad (see FIG. 7). The other end of the strain resistive element S and the other end of the temperature compensating resistive element 24 (upper ends in the drawing) are connected to their respective signal electrode pads 25, 25.

An upper half of the bridged circuit is provided to the half-bridged circuit HB to form a full-bridged circuit, to thereby take out a resistance value from which an effect of the temperature change in the strain resistive element S is eliminated.

Specifically, in the full-bridged circuit as shown in FIG. 9B, the signal electrode pads 25, 25, to which the end (upper end in the drawing) of the strain resistive element S and the end (upper end in the drawing) of the temperature compensating resistive element 24 are connected, are connected to their respective ends of the external resistances R1, R2. The other ends of the external resistances R1, R2 are connected to each other, which are then connected to a supply voltage VE.

With this configuration of the full-bridged circuit, and by detecting an output signal between the signal electrode pad 25 on a strain resistive element S side and the signal electrode pad 25 on a temperature compensating resistive element 24 side, a change in the resistance value due to the temperature change is eliminated from a change in the resistance value of the strain resistive element S to thereby exclusively take out and detect a change in the resistance value by the external force F (see FIG. 1A) on the strain resistive element S.

Next, an action of the force sensor 1 according to an embodiment of the present invention will be described.

When the external force F containing various axial components is input to the force sensor 1 according to an embodiment of the present invention, the external force F is attenuated by a predetermined ratio and the attenuated force is transmitted to the force sensor chip 2. An action of the attenuator 3 to which the external force F with various axial components is input will be described with reference to FIGS. 10A-10D. FIGS. 10A-10D show perspective views of action of the attenuator when an external force is applied.

Figure 10A:
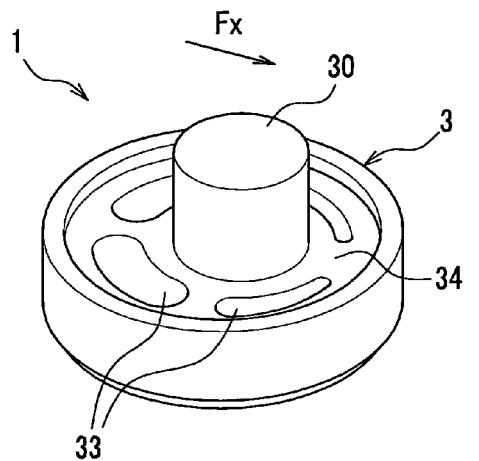
FIG. 10A-10D show perspective views of action of the attenuator when an external force is applied.
Figure 10B:
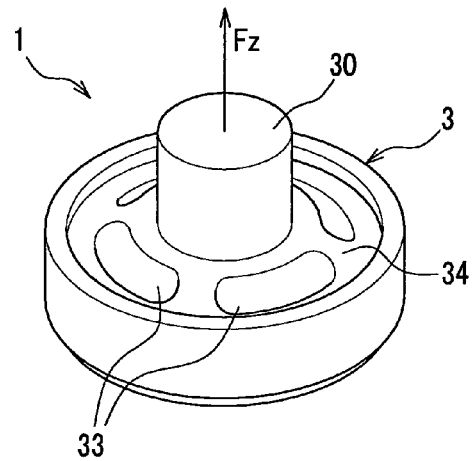
Figure 10C:
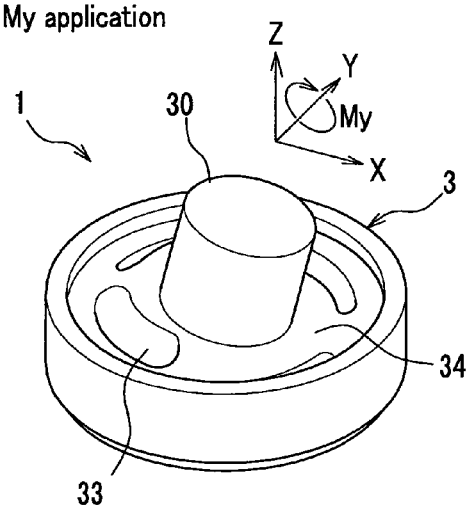
Figure 10D:
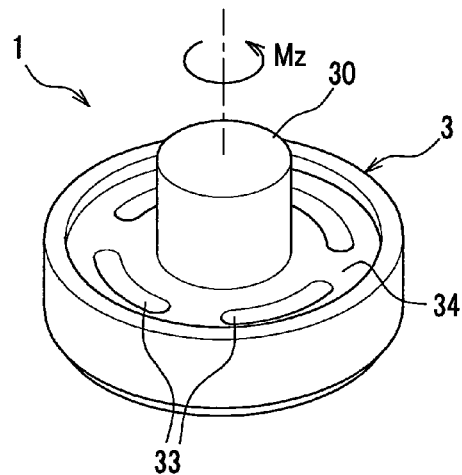
Figure 10D:
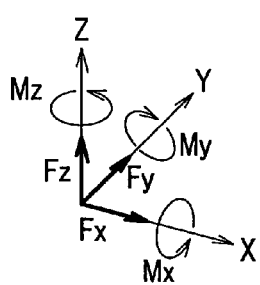

For example, as shown in FIG. 10A, when an external force Fx in the X-axis direction is input to the input portion 30, the input portion 30 slightly shifts in the X-axis direction. Likewise, when an external force Fz in the Z-axis direction is input, as shown in FIG. 10B, the input portion 30 slightly shifts in the Z-axis direction. Then, when a moment My about the Y-axis is input, the input portion 30 rotates about the Y-axis, and when a moment Mz about the Z-axis is input, the input portion 30 rotates about the Z-axis. The same is applied to the other axial components, and thus a duplicate description is omitted.

A state of strain in the force sensor chip 2 generated when the external force F (Fx, Fz, My, Mz) is applied will be described with reference to FIGS. 11-14.

Figure 11A:
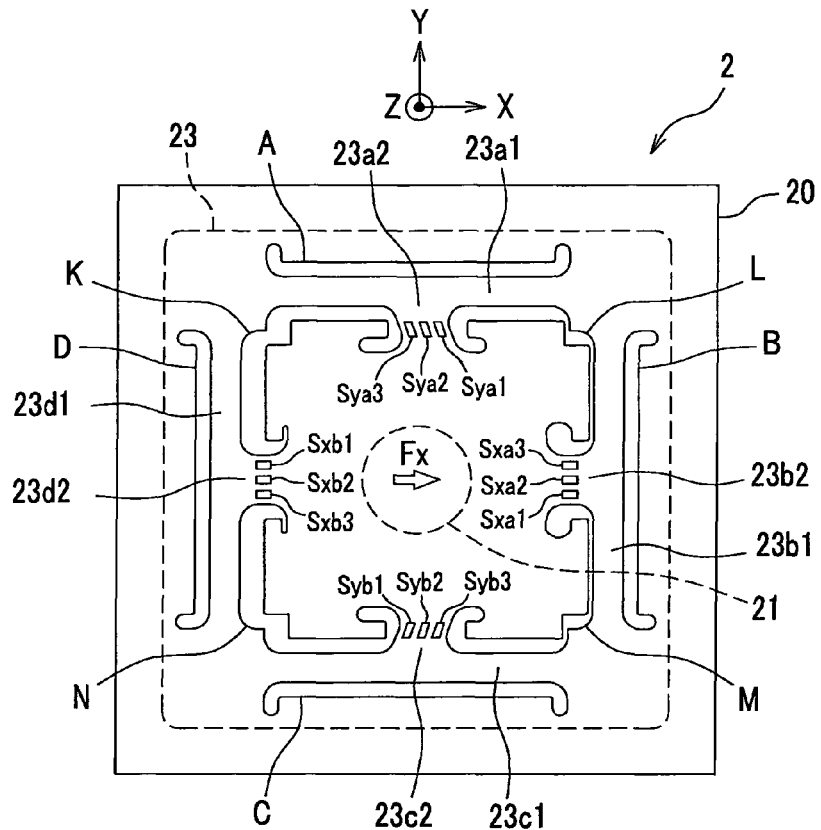
Figure 11B:
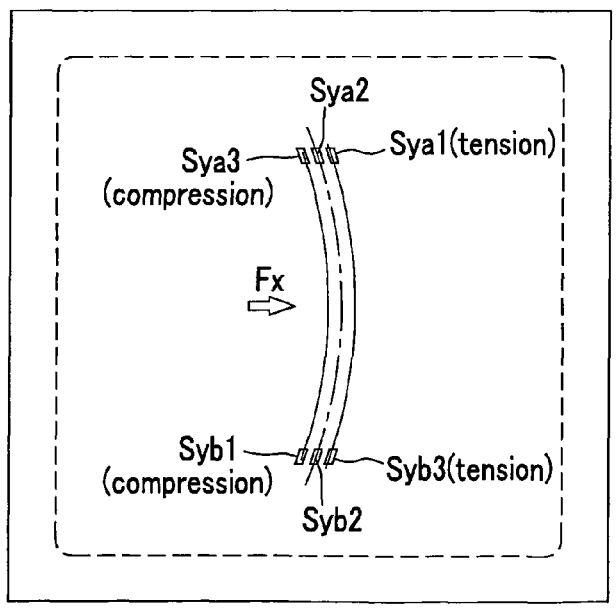

FIGS. 11A and 11B explain a deformed state of strain resistive elements when an external force Fx is transmitted to the action portion, in which FIG. 11A is a plan view, and FIG. 11B is a plan view showing a deformed state of the strain resistive elements.

As shown in FIG. 11A, with the application of the external force Fx, the action portion 21 tends to move in the X-axis direction. Consequently, notable deflections are generated in the bridge portions 23a2, 23c2. Under this condition, as shown in FIG. 11B, a tensile force acts on the strain resistive elements Sya1, Syb3 on an outer side of the deflection, leading to an increased resistance value. On the other hand, a compressive force acts on the strain resistive elements Sya3, Syb1 on an inner side of the deflection, leading to a reduced resistance value. The strain resistive elements Sxa1-Sxa3, Sxb1-Sxb3 are not affected by the external force Fx.

Figure 12A:
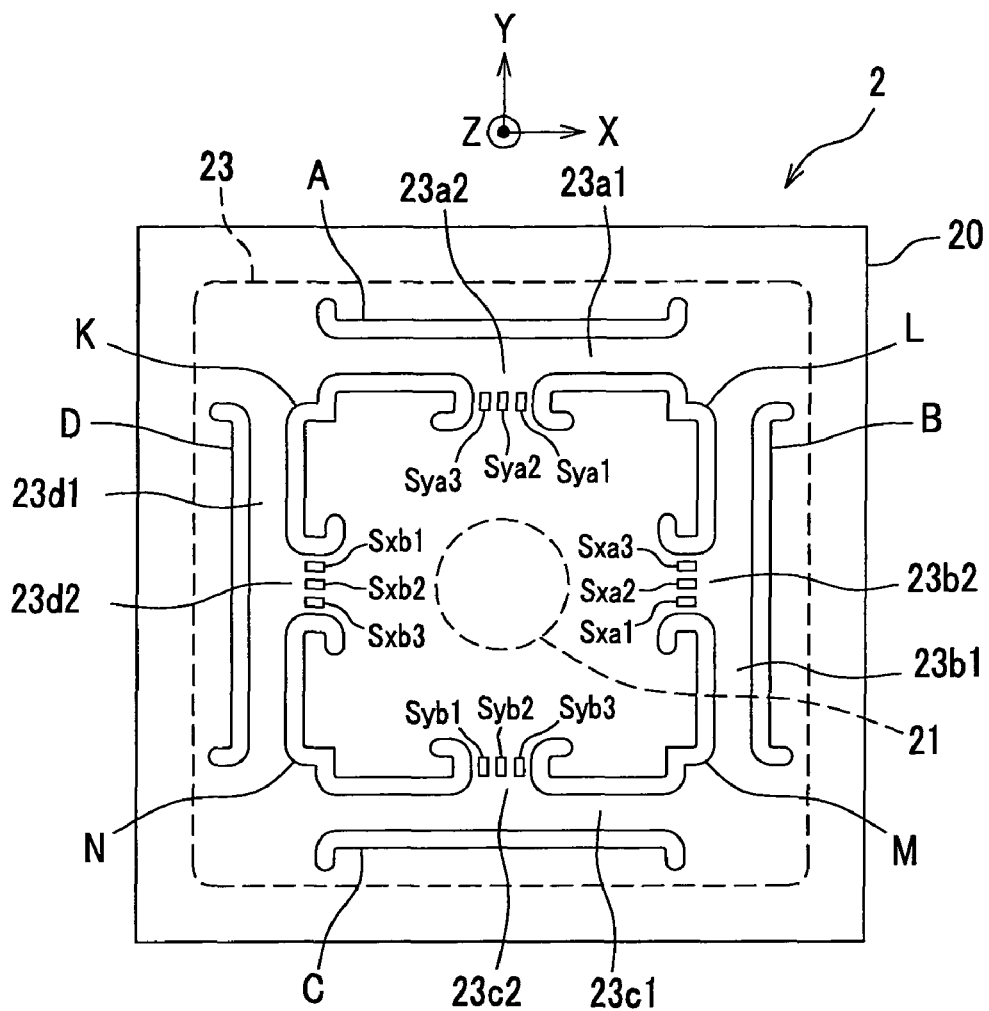
Figure 12B:
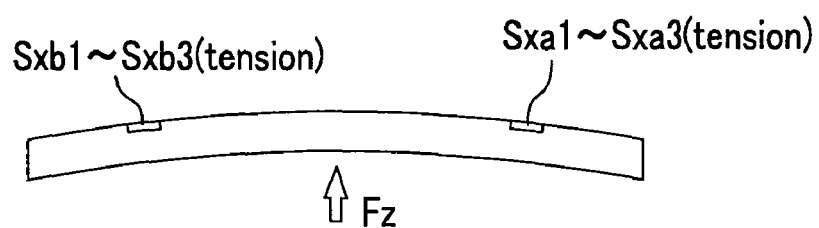

FIGS. 12A and 12B explain a deformed state of strain resistive elements when an external force Fz is transmitted to the action portion, in which FIG. 12A is a plan view, and FIG. 12B is a cross-sectional view showing a deformed state of the strain resistive elements.

As shown in FIG. 12B, with the application of the external force Fz, the action portion 21 tends to move in the Z-axis direction. Consequently, notable deflections are generated in the bridge portions 23a2, 23b2, 23c2, 23d2. Under this condition, a tensile force acts on all of the strain resistive elements Sxa1-Sxa3, Sxb1-Sxb3, Sya1-Sya3, Syb1-Syb3, leading to an increased resistance value, since all of the strain resistive elements Sxa1-Sxa3, Sxb1-Sxb3, Sya1-Sya3, Syb1-Syb3 are disposed on the surface (upper layer) of the semiconductor substrate 20.

Figure 13A:
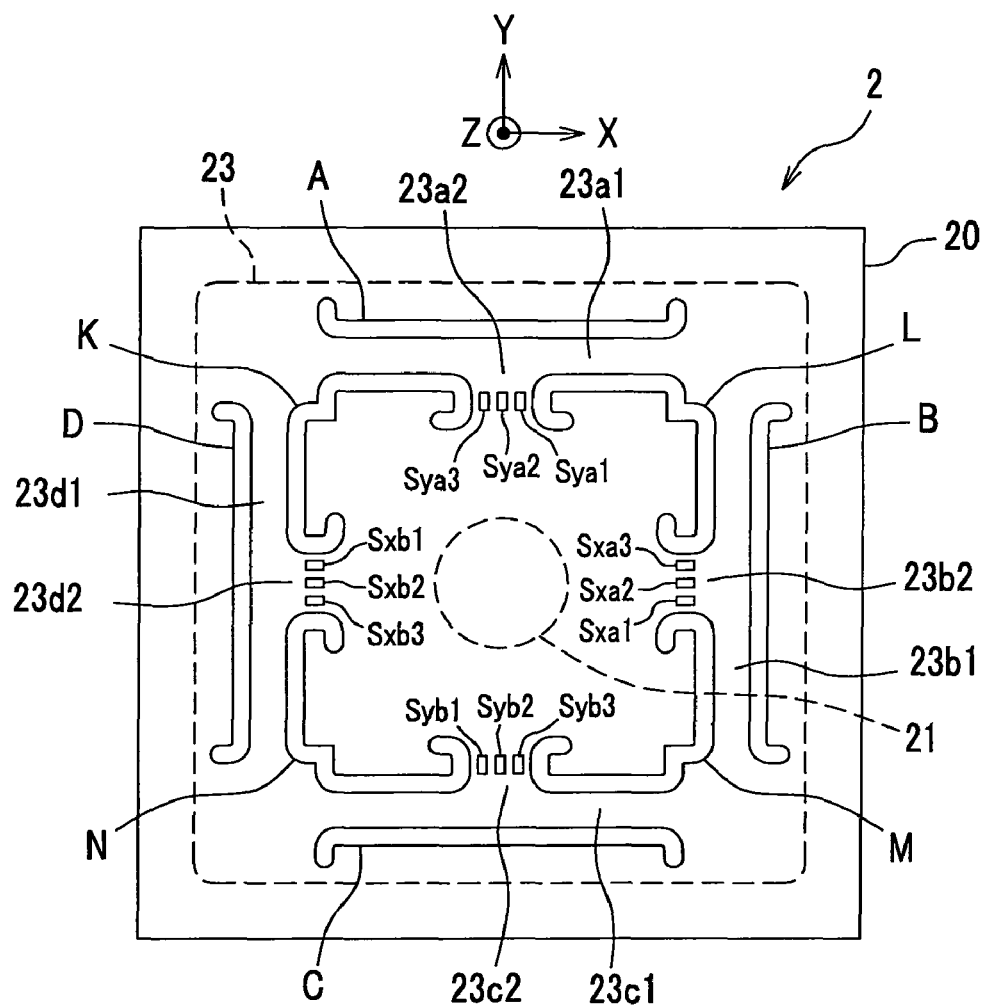
Figure 13B:
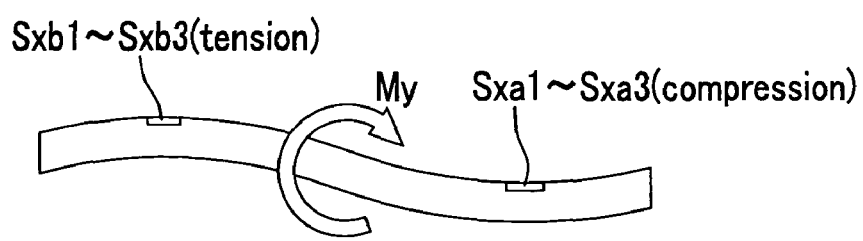

FIGS. 13A and 13B explain a deformed state of strain resistive elements when a moment My is transmitted to the action portion, in which FIG. 13A is a plan view, and FIG. 13B is a cross-sectional view showing a deformed state of the strain resistive elements.

As shown in FIG. 13B, with the application of the moment My, each of the bridge portions 23b2, 23d2 has a deflection in the X-axis direction, and a compressive force acts on the strain resistive elements Sxa1-Sxa3, leading to a reduced resistance value. On the other hand, a tensile force acts on the strain resistive elements Sxb1-Sxb3, leading to an increased resistance value. Neither the tensile force nor the compressive force acts on the bridge portions 23a2, 23c2 in the Y-axis direction, leading to no change in the resistance value.

Figure 14A:
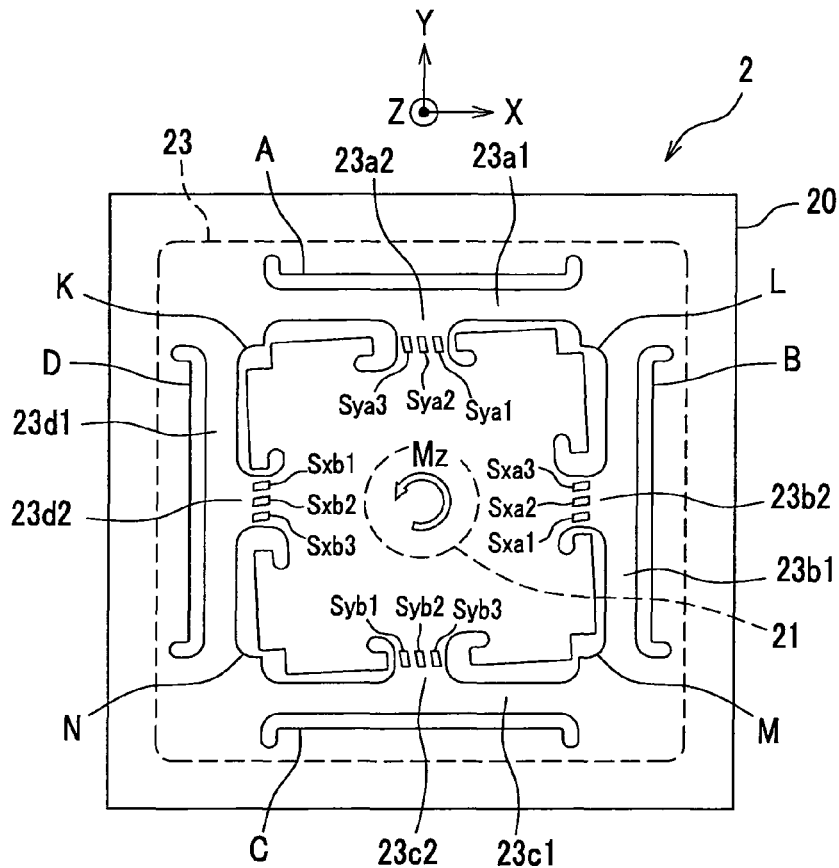
Figure 14B:
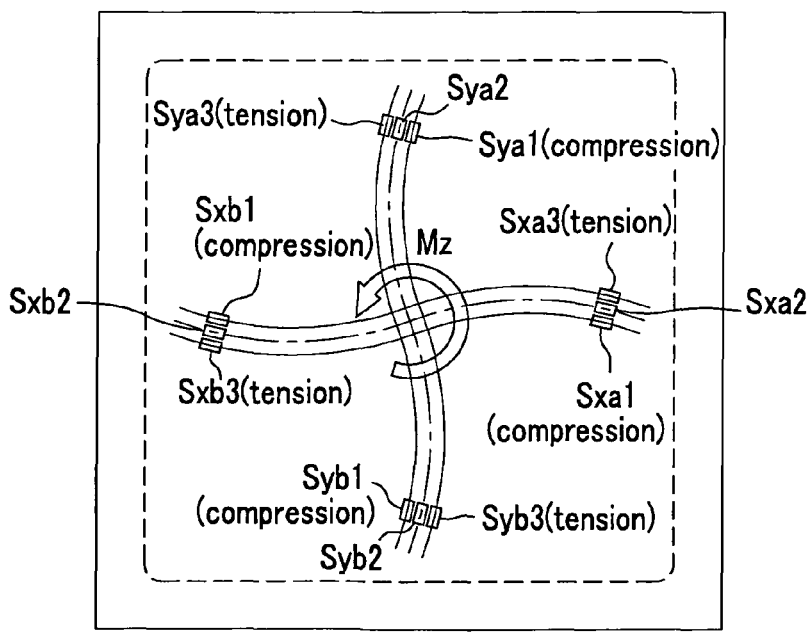

FIGS. 14A and 14B explains a deformed state of strain resistive elements when an external force Mz is transmitted to the action portion, in which FIG. 14A is a plan view, and FIG. 14B is a plan view showing a deformed state of the strain resistive elements.

As shown in FIG. 14B, with the application of the moment Mz, each of the bridge portions 23a2, 23b2, 23c2, 23d2 has a deflection, and a tensile force acts on each of the strain resistive elements Sya3, Sxa3, Syb3, Sxb3 on an outer side of the deflection, leading to an increased resistance value. On the other hand, a compressive force acts on the strain resistive elements Sya1, Sxa1, Syb1, Sxb1 on an inner side of the deflection, leading to a reduced resistance value. Neither the tensile force nor the compressive force acts on the strain resistive elements Sxa2, Sxb2, Sya2, Syb2 locating at the center of the deflection, leading to no change in the resistance value.

Relationships between the components (force and moment) of the external force F and the forces act on the strain resistive element S have been schematically described with reference to the four representative axial forces. When a compressive force or a tensile force acts on the strain resistive element S, the resistance value either increases or decreases, and a rate of the change in the resistance value (resistance change rate) is detected by the bridged circuit (FIGS. 9A and 9B).

Based on the resistance change rate, signals ultimately output from the hexaxial force sensor 1 are computed as resistance change rates Sig1-Sig6, corresponding to respective components (Fx, Fy, Fz, Mx, My, Mz).

In other words, the computed resistance change rates Sig1-Sig6 can be defined as follows from the resistance change rate so as to correspond to the respective components (Fx, Fy, Fz, Mx, My, Mz) included in the external force, after eliminating interference by other axial components as much as possible.

$$Sig1=((R'Sya1-R'Sya3)+(R'Syb3-R'Syb1))/4$$

$$Sig2=((R'Sxa3-R'Sxa1)+(R'Sxb1-R'Sxb3))/4$$

$$Sig3=(R'Sxa2+R'Sya2+R'Sxb2+R'Syb2)/4$$

$$Sig4=(R'Sya2-R'Syb2)/2$$

$$Sig5=(R'Sxb2-R'Sxa2)/2$$

$$Sig6=((R'Sxa3-R'Sxa1)+(R'Sya3-R'Sya1)+(R'Sxb3-R'Sxb1)+(R'Syb3-R'Syb1))/8$$

Herein, the resistance change rate is represented as, for example, "R'Sya1", which indicates a resistance change rate in Sya1. It should be noted that R'Sxa1, R'Sxa2, R'Sxa3, R'Sxb1, R'Sxb2, R'Sxb3, R'Sya1, R'Sya2, R'Sya3, R'Syb1, R'Syb2 and R'Syb3 indicate change rates after temperature compensation of the respective strain resistive elements.

Relationships between the hexaxial components (Fx, Fy, Fz, Mx, My, Mz) and the computed resistance change rates Sig1-Sig6 will be described. In order to calculate the components of the applied external force F based on the computed resistance change rates Sig1-Sig6, which are output signals of the force sensor 1, an axial force of a single component is preliminarily applied to the force sensor chip 2 and the output signal Sig1-Sig6 are calculated in advance. Based on the obtained values, the relationships between the hexaxial components (Fx, Fy, Fz, Mx, My, Mz) and the computed resistance change rates Sig1-Sig6 can be acquired.

Specifically, for example, when one applies the axial force Fx to the force sensor chip 2, the moment My is also applied in practice. However, the configuration of the force sensor chip 2 and the arrangement of the strain resistive element S and the like are designed as four-fold symmetry, and thus interference by other axial components can be eliminated as much as possible. As a result, Sig1 can be represented as a primary expression of Fx and My. Likewise, when the external force Fy is applied to the force sensor chip 2, Sig2 can be represented as a primary expression of Fy and Mx. Sig3 can be largely represented as a primary expression of Fz (other axial components can be suppressed to a negligible extent).

The same applies to the axial moment, and when the moment Mx is applied to the force sensor chip 2, Sig4 can be represented as a primary expression of Mx and Fy. When the moment My is applied to the force sensor chip 2, Sig5 is represented as a primary expression of My and Fx. Sig6 can be represented as a primary expression of Mz (other axial components can be suppressed to a negligible extent).

For the detailed description regarding this matter, a reference can be made to Japanese unexamined patent publication No. 2003-207405 (FIG. 13), which is a pending application by the same applicant.

With the preliminary tests described above, the computed resistance change rates Sig1-Sig6 can be represented by respective primary expressions of hexaxial components (Fx, Fy, Fz, Mx, My, Mz), while eliminating interference by other axial components as much as possible. From the primary expressions (determinants), an invert matrix can be obtained and thus the hexaxial components (Fx, Fy, Fz, Mx, My, Mz) can be represented by the primary expressions of the computed resistance change rates Sig1-Sig6. In this manner, the hexaxial components (Fx, Fy, Fz, Mx, My, Mz) can be obtained from the computed resistance change rates Sig1-Sig6 (see Japanese unexamined patent publication No. 2003-207405, paragraph [0070] for details).

Figure 15A:
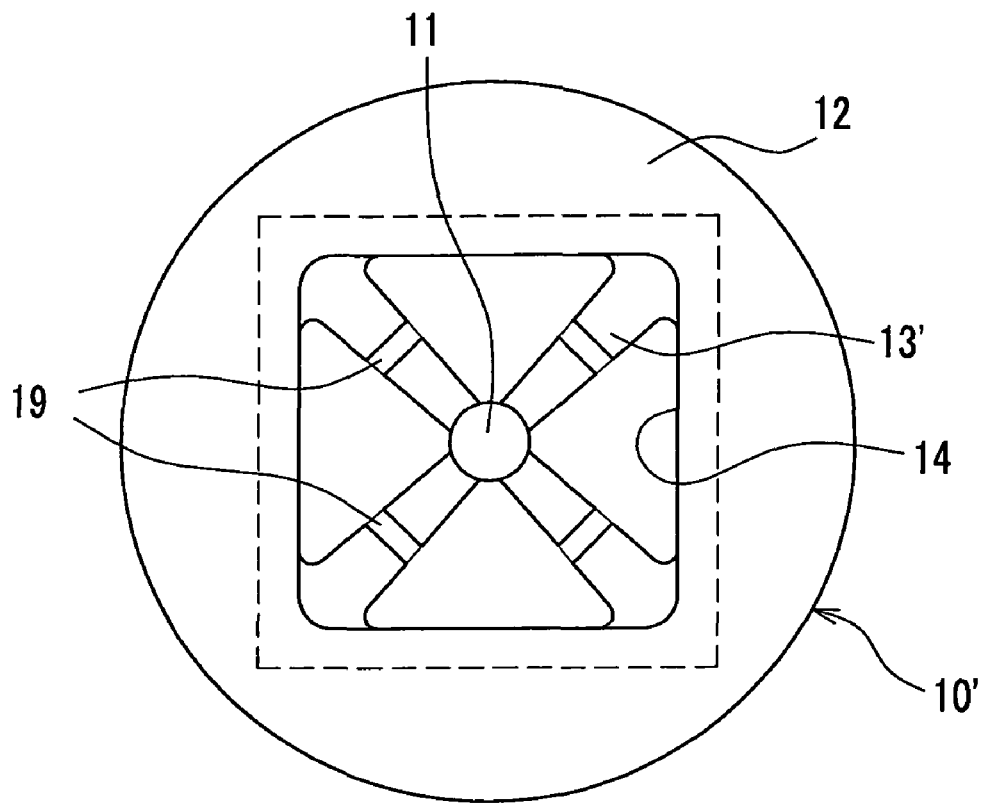
Figure 15B:
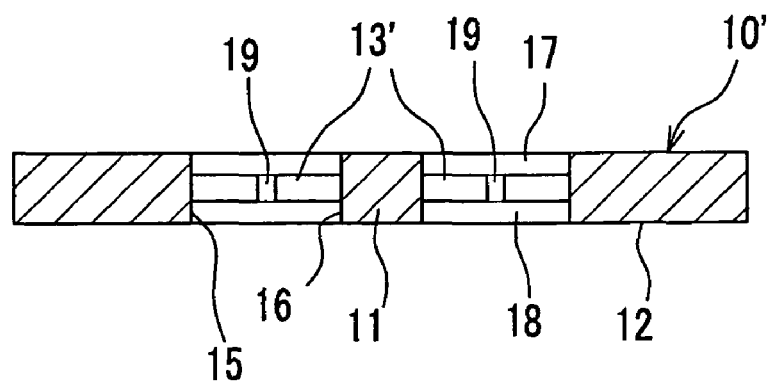
Figure 16:
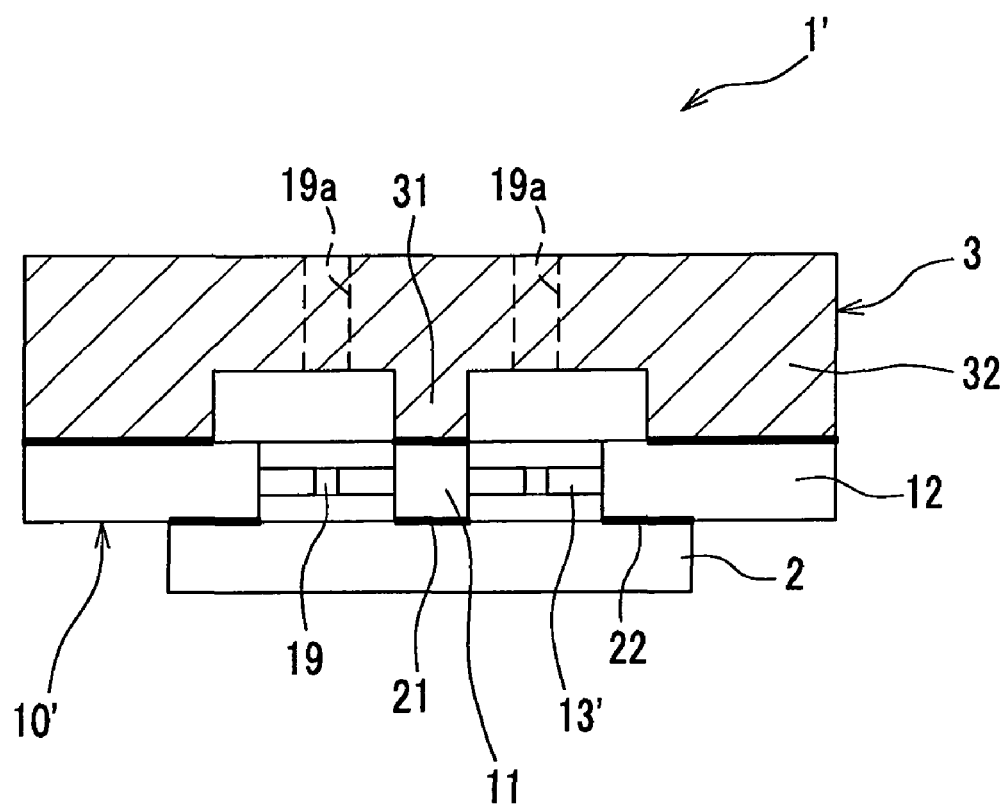
FIG. 16 is a cross-sectional view showing a configuration of a force sensor according to the second embodiment of the present invention.

Next, a force sensor 1' and a method for producing the same according to a second embodiment of the present invention will be explained with reference to FIGS. 15 and 16. FIGS. 15A and 15B illustrate a configuration of a glass member of a force sensor according to a second embodiment of the present invention, in which FIG. 15A shows a plan view, and FIG. 15B shows a cross-sectional view. FIG. 16 is a cross-sectional view showing a configuration of a force sensor according to the second embodiment of the present invention.

In the glass member according to the second embodiment of the present invention, as shown in FIGS. 15A and 15B, in each of four glass beams 13', there is formed a discontinuous portion 19 that blocks the transmission of the external force F between the first glass member 11 and the second glass member 12. The discontinuous portion 19 is formed by cutting a middle portion of the glass beam 13' with laser beam (by laser beam cutting).

Specifically, the discontinuous portions 19 can be formed through the buffer holes 33 (see FIG. 1) of the attenuator 3, or as shown in FIG. 16, first by forming small holes 19a in the disc portion for a laser beam cutting operation, and cutting the glass beams 13'.

It should be noted that the technique of forming the discontinuous portion 19 is not limited to the laser beam cutting, and it may be formed by mechanically cutting with a cutter or by breaking the glass beam 13' with a load applied to the glass beam 13'. Also in these cases, the buffer holes 33 of the attenuator 3 can be utilized, or the small holes 19a may be formed in the disc portion for facilitating the operation.

By forming the discontinuous portion in the glass beam 13', which blocks the transmission of the external force F from the first glass member to the second glass member, a transmission route of the external force F can be simplified. Specifically, the external force F is composed exclusively of a force transmitted to the force sensor chip 2 and a force transmitted from the fixing portion 32 of the attenuator 3 to an external system, thus the transmission route of the external force F is simplified.

Therefore, by avoiding a stress concentration caused by the external force F transmitted to the glass beam 13', it becomes possible to prevent the first glass member 11 and the second glass member 12 from being damaged. In addition, there is no need to consider the stress concentration in the glass beam 13' upon designing the force sensor chip 2 and the attenuator 3, leading to improvement in design flexibility.

Figure 17:
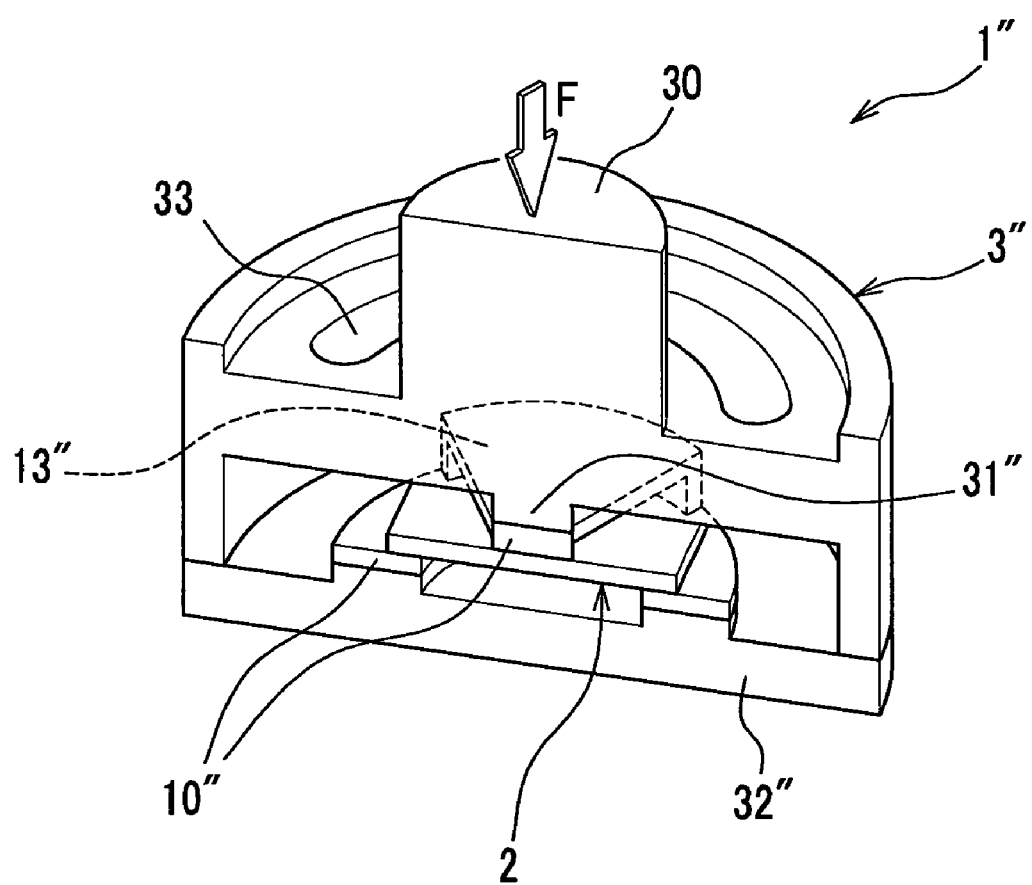
FIG. 17 is a cross-sectional perspective view for explaining a force sensor according to a third embodiment of the present invention.
Figure 18A:
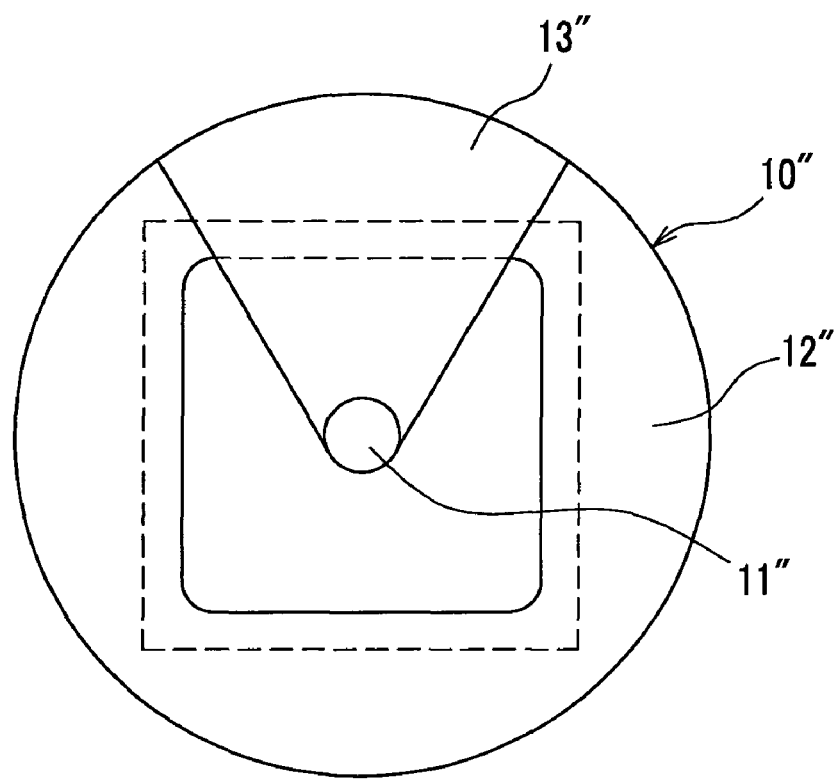
Figure 18B:
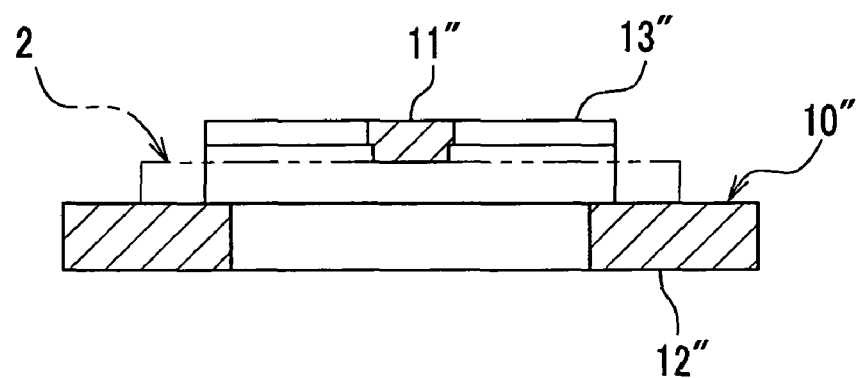

Next, a force sensor 1" according to a third embodiment of the present invention will be described with reference to FIGS. 17 and 18. FIG. 17 is a cross-sectional perspective view for explaining a force sensor according to a third embodiment of the present invention. FIGS. 18A and 18B illustrate a configuration of a glass member of a force sensor according to a third embodiment of the present invention, in which FIG. 18A shows a plan view, and FIG. 18B shows a cross-sectional view.

In the following description, components which are the same as those illustrated in the force sensor 1 according to the first embodiment described above are designated with the same reference characters, and thus a duplicate description is omitted.

As shown in FIG. 17, the force sensor 1" according to the third embodiment is different from the force sensor 1 according to the first embodiment described above, in the configuration of an attenuator 3", and therefore the configuration of the glass member 10" is also different. Specifically stated, in the force sensor 1 of the first embodiment described above, the transmission portion 31 and the fixing portion 32 are present on the same side of the force sensor chip 2; while in the force sensor 1" according to the third embodiment, a fixing portion 32" for fixing the force sensor chip 2 is joined to a lower face of the force sensor chip 2 in the drawing and a transmission portion 31" is joined to an upper face of the force sensor chip 2.

Accordingly in the glass member 10", as shown in FIGS. 18A and 18B, a first glass member 11" is disposed above a second glass member 12", and a joint member 13" connects the first glass member 11" and the second glass member 12". The first glass member 11", the joint member 13" and the second glass member 12" together forms an approximate squared U-shape when seen from a lateral side as a cross sectional view.

The configuration of holding the force sensor chip 2 by the attenuator 3 may vary as described above, and other modifications can be also applied to the present invention, by appropriately configuring the joint member in accordance with the configuration of the attenuator 3.

The embodiments of the present invention have been described above. However, the present invention is not limited to the above embodiments, and it is a matter of course that the above embodiments may be properly modified.

For example, in the embodiments above, the first glass member 11, the second glass member 12 and the glass beam 13 are mechanically carved out as a single glass member from a single glass material. However, the present invention is not limited to these embodiments, and the first glass member 11 and the second glass member 12 may be separately formed and then a glass member can be utilized for integrally joining the first glass member 11 and the second glass member 12.

In the embodiments above, the glass member 10 and the attenuator 3, and the glass member 10 and the force sensor chip 2, are joined by anodic bonding. However, the present invention is not limited to these embodiments, and they may be joined with an adhesive.

In the embodiments above, in the force sensor chip 2, the action portion 21 is provided at the center, and the connecting portion 23 and the support portion 22 are formed on the outer side of the action portion 21. However, the present invention is not limited to this configuration, and the support portion 22 may be provided at the center, the connecting portion 23 may be provided on the outer side of the support portion 22, and then the action portion 21 may be provided on the further outer side of the connecting portion 23. In short, any configuration can be adopted to the force sensor chip 2, as long as the strain resistive element S disposed on the connecting portion 23 which is adjacent to the action portion 21 can detect the external force F transmitted to the action portion 21, and the support portion 22 can support the connecting portion 23 and the action portion 21.

Moreover, in the embodiments above, the force sensor chip 2 is in a shape of an approximate square. However, the present invention is not limited to this shape, and the force sensor chip 2 may be in a rectangular shape, a circle or the like. In addition, the attenuator 3 may be in a form of a cube, a rectangular parallelepiped or the like. To the present invention, various embodiments can be applied with respect to the shape of the force sensor chip 2, the shape of the attenuator 3, and the combinations thereof.

In the embodiments above, each of the number of the strain resistive elements S and the temperature compensating resistive elements 24 is set at 12, but the present invention is not limited to this number, and any number can be applied in accordance with a shape of the sensor chip 2 and the like. With respect to the positional arrangement of the strain resistive elements S and the temperature compensating resistive elements 24, any position different from the present embodiments can be applied.

We claim:

1. A force sensor comprising:
a force sensor chip comprising:
an action portion to which an external force is transmitted,
a connecting portion which is adjacent to the action portion and on which strain resistive elements are disposed, and
a support portion for supporting the action portion and the connecting portion,
the force sensor chip for detecting an external force by the strain resistive elements;
an attenuator comprising:
an input portion to which the external force is input,
a fixing portion for fixing the force sensor chip, and
a transmission portion for attenuating the external force and transmitting the attenuated external force to the action portion;
a first glass member disposed between the action portion and the transmission portion and a second glass member disposed between the support portion and the fixing portion, through which first and second glass members the force sensor chip and the attenuator are joined; and
a joint member for joining the first glass member and the second glass member together as a single member.

2. The force sensor according to claim 1, wherein the first glass member and the second glass member are disposed on the same side of the force sensor chip.

3. The force sensor according to claim 1, wherein the joint member is a glass member.

4. The force sensor according to claim 1, wherein the joint members are disposed at symmetrical positions or at equiangular positions with respect to the first glass member or the second glass member.

5. The force sensor according to claim 1, wherein
the action portion is disposed on a center portion of the force sensor chip,
the support portion is disposed on a peripheral portion of the force sensor chip, and
the connecting portion is disposed between the action portion and the support portion.

6. A force sensor comprising:
a force sensor chip comprising:
an action portion to which an external force is transmitted,
a connecting portion which is adjacent to the action portion and on which strain resistive elements are disposed, and
a support portion for supporting the action portion and the connecting portion, the force sensor chip for detecting an external force by the strain resistive elements;
an attenuator comprising:
an input portion to which the external force is input,
a fixing portion for fixing the force sensor chip, and
a transmission portion for attenuating the external force and transmitting the attenuated external force to the action portion;
a first glass member disposed between the action portion and the transmission portion and a second glass member disposed between the support portion and the fixing portion, through which first and second glass members the force sensor chip and the attenuator are joined; and
a joint member for joining the first glass member and the second glass member together as a single member;
the first glass member and the second glass member being joined to the force sensor chip and the attenuator by anodic bonding.

7. The force sensor according to claim 6, wherein the joint member is a glass member.

8. The force sensor according to claim 6, wherein the joint member is joined to the first glass member and the second glass member while coming into contact with neither the force sensor chip nor the attenuator.

9. The force sensor according to claim 6, wherein the joint members are disposed at symmetrical positions or at equiangular positions with respect to the first glass member or the second glass member.

10. The force sensor according to claim 6, wherein
the action portion is disposed on a center portion of the force sensor chip,
the support portion is disposed on a peripheral portion of the force sensor chip, and
the connecting portion is disposed between the action portion and the support portion.

11. The force sensor according to claim 6, wherein the joint member has a discontinuous portion formed therein which breaks the joining and blocks a transmission of the external force between the first glass member and the second glass member.

12. A force sensor comprising:
a force sensor chip comprising:
an action portion to which an external force is transmitted,
a connecting portion which is adjacent to the action portion and on which strain resistive elements are disposed, and
a support portion for supporting the action portion and the connecting portion,
the force sensor chip for detecting an external force by the strain resistive elements;
an attenuator comprising:
an input portion to which the external force is input,
a fixing portion for fixing the force sensor chip, and
a transmission portion for attenuating the external force and transmitting the attenuated external force to the action portion;
a first glass member disposed between the action portion and the transmission portion and a second glass member disposed between the support portion and the fixing portion, through which first and second glass members the force sensor chip and the attenuator are joined; and
a joint member for joining the first glass member and the second glass member together as a single member
the joint member being joined to the first glass member and the second glass member while coming into contact with neither the force sensor chip nor the attenuator.

13. The force sensor according to claim 12, wherein the joint members are disposed at symmetrical positions or at equiangular positions with respect to the first glass member or the second glass member.

14. The force sensor according to claim 12, wherein
the action portion is disposed on a center portion of the force sensor chip,
the support portion is disposed on a peripheral portion of the force sensor chip, and
the connecting portion is disposed between the action portion and the support portion.

15. The force sensor according to claim 12, wherein the joint member has a discontinuous portion formed therein which breaks the joining and blocks a transmission of the external force between the first glass member and the second glass member.

16. A force sensor comprising:
a force sensor chip comprising:
an action portion to which an external force is transmitted,
a connecting portion which is adjacent to the action portion and on which strain resistive elements are disposed, and
a support portion for supporting the action portion and the connecting portion,
the force sensor chip for detecting an external force by the strain resistive elements;
an attenuator comprising:
an input portion to which the external force is input,
a fixing portion for fixing the force sensor chip, and
a transmission portion for attenuating the external force and transmitting the attenuated external force to the action portion;
a first glass member disposed between the action portion and the transmission portion and a second glass member disposed between the support portion and the fixing portion, through which first and second glass members the force sensor chip and the attenuator are joined; and
a joint member for joining the first glass member and the second glass member together as a single member,
the joint member having a discontinuous portion formed therein which breaks the joining and blocks a transmission of the external force between the first glass member and the second glass member.

17. A method for producing a force sensor comprising:
first joining a first glass member and a second glass member of a glass plate member to a transmission portion and a fixing portion of an attenuator, respectively, to join the glass plate member and the attenuator; and
second joining the first glass member and the second glass member to an action portion and a support portion of a force sensor, respectively, to join the glass plate member and the force sensor,
wherein the first glass member is disposed between the action portion and the transmission portion,
wherein the second glass member is disposed between the support portion and the fixing portion, and
wherein the first glass member and the second glass member are joined together as a single member by a joint member of the glass plate member.

18. The method for producing a force sensor according to claim 17, further comprising: forming a discontinuous portion in the joint member, which blocks a transmission of the external force from the first glass member to the second glass member, after the second joining step.

19. The method for producing a force sensor according to claim 18, wherein the forming the discontinuous portion comprises cutting the joint member with a laser beam.

20. A method for producing a force sensor comprising:
first joining a first glass member and a second glass member of a glass plate member to an action portion and a support portion of a force sensor, respectively, to join the glass plate member and the force sensor; and
second joining the first glass member and the second glass member to a transmission portion and a fixing portion of an attenuator, respectively, to join the glass plate member and the attenuator,
wherein the first glass member is disposed between the action portion and the transmission portion,
wherein the second glass member is disposed between the support portion and the fixing portion, and
wherein the first glass member and the second glass member are joined together as a single member by a joint member of the glass plate member.

21. The method for producing a force sensor according to claim 20, further comprising:
forming a discontinuous portion in the joint member, which blocks a transmission of the external force from the first glass member to the second glass member, after the second joining step.

22. The method for producing a force sensor according to claim 21, wherein the forming the discontinuous portion comprises cutting the joint member with a laser beam.

* * * * *